(12) United States Patent
Boromand et al.

(10) Patent No.: US 11,878,493 B2
(45) Date of Patent: Jan. 23, 2024

(54) HIGH MODULUS, HIGH THERMAL CONDUCTIVITY RADIATIVE PASSIVE COOLANT

(71) Applicant: Meta Platforms Technologies, LLC, Menlo Park, CA (US)

(72) Inventors: Arman Boromand, Issaquah, WA (US); Sheng Ye, Redmond, WA (US); Andrew John Ouderkirk, Kirkland, WA (US); Christopher Stipe, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/843,138

(22) Filed: Jun. 17, 2022

(65) Prior Publication Data
US 2023/0039862 A1 Feb. 9, 2023

Related U.S. Application Data

(60) Provisional application No. 63/226,238, filed on Jul. 28, 2021.

(51) Int. Cl.
*B32B 27/32* (2006.01)
*B32B 7/12* (2006.01)
(Continued)

(52) U.S. Cl.
CPC ............... *B32B 27/32* (2013.01); *B32B 7/12* (2013.01); *B32B 27/08* (2013.01); *B32B 27/20* (2013.01);
(Continued)

(58) Field of Classification Search
None
See application file for complete search history.

(56) References Cited

U.S. PATENT DOCUMENTS 5,453,333 A * 9/1995 Takauchi ............ H01M 50/491
429/142
2002/0001753 A1 1/2002 Pekala et al.
(Continued)

FOREIGN PATENT DOCUMENTS

JP 2020158312 A * 10/2020
WO 2010090627 A2 8/2010
(Continued)

OTHER PUBLICATIONS

Machine translation of JP 2020-158312 A (Year: 2020).*
(Continued)

*Primary Examiner* — Ramsey Zacharia
(74) *Attorney, Agent, or Firm* — Greenberg Traurig, LLP

(57) ABSTRACT

A polymer bilayer includes a layer of a porous fluoropolymer directly overlying a layer of polyethylene. The polyethylene layer may be porous or dense and may include an ultra-high molecular weight polymer. The polymer bilayer may be co-integrated with structures (e.g., wearable devices) exposed to high thermal loads (>0-1000 W/m²) and provide passive cooling thereof. For instance, passive cooling of AR/VR glasses under different solar loads may be achieved by a polymer bilayer that is both highly reflective across solar heating wavelengths and highly emissive in the long-wavelength infrared. The high reflectance decreases energy absorption across the solar spectrum while the high emissivity promotes radiative heat transfer to the surroundings.

17 Claims, 6 Drawing Sheets

(51) Int. Cl.
  *B32B 27/08* (2006.01)
  *B32B 27/20* (2006.01)
  *G06F 3/01* (2006.01)
  *G06T 19/00* (2011.01)

(52) U.S. Cl.
  CPC ............ *B32B 27/322* (2013.01); *G06F 3/011* (2013.01); *G06T 19/006* (2013.01); *B32B 2305/026* (2013.01); *B32B 2305/28* (2013.01); *B32B 2307/4026* (2013.01); *B32B 2307/412* (2013.01); *B32B 2307/416* (2013.01)

(56) References Cited

U.S. PATENT DOCUMENTS

| | | |
|---|---|---|
| 2009/0214852 A1 | 8/2009 | Kelsey et al. |
| 2017/0248381 A1* | 8/2017 | Yang .................... F28F 21/089 |
| 2020/0230924 A1* | 7/2020 | Bronstein ................ B32B 7/02 |
| 2020/0309995 A1 | 10/2020 | Wells et al. |
| 2021/0208319 A1 | 7/2021 | Ouderkirk et al. |
| 2021/0399382 A1 | 12/2021 | Jia et al. |
| 2022/0212723 A1* | 7/2022 | Newcomb ............. B32B 27/306 |
| 2022/0221235 A1 | 7/2022 | Hebrink et al. |
| 2023/0008147 A1 | 1/2023 | Hebrink et al. |

FOREIGN PATENT DOCUMENTS

| | | |
|---|---|---|
| WO | 2018181330 A1 | 10/2018 |
| WO | 2020240447 A1 | 12/2020 |

OTHER PUBLICATIONS

Machine translation of JPWO 2018/181330 A1 (Year: 2018).*
International Search Report and Written Opinion for International Application No. PCT/US2022/038597, dated Nov. 9, 2022, 9 pages.
International Search report and Written Opinion for International Application No. PCT/US2022/038601, dated Oct. 28, 2022, 9 pages.

* cited by examiner

HIGH MODULUS, HIGH THERMAL CONDUCTIVITY RADIATIVE PASSIVE COOLANT

CROSS-REFERENCE TO RELATED APPLICATION

This application claims the benefit of priority under 35 U.S.C. § 119(e) of U.S. Provisional Application No. 63/226,238, filed Jul. 28, 2021, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
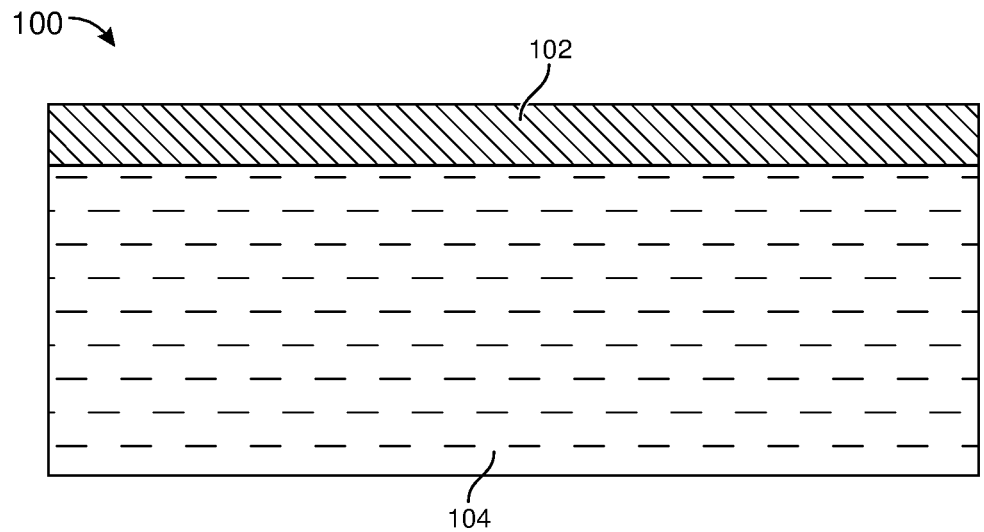
FIG. 1 is a schematic illustration of a polymer bilayer structure including a layer of a porous fluoropolymer and an adjacent layer of highly thermally conductive, ultra-high molecular weight polyethylene (UHMWPE) according to some embodiments.
Figure 2:
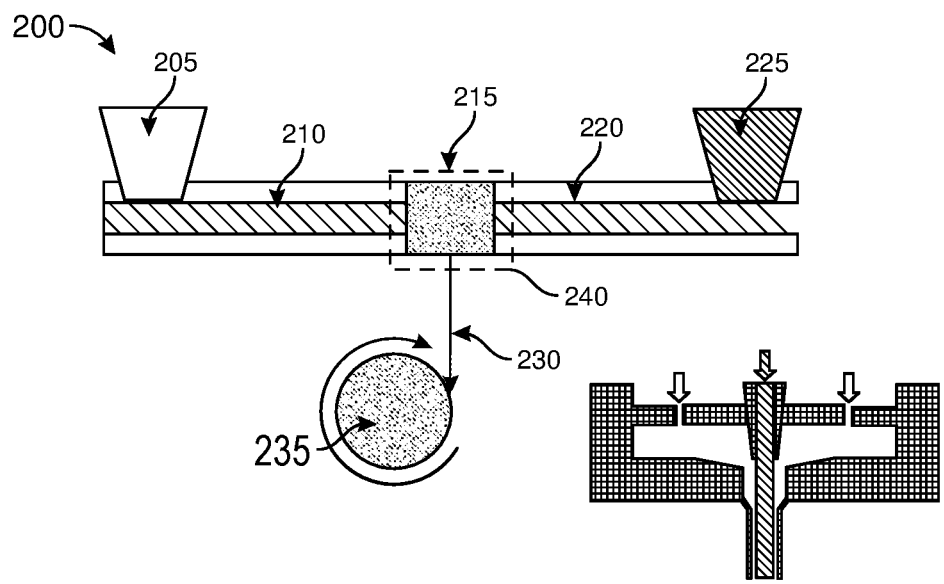
FIG. 2 illustrates an example apparatus for forming a one-dimensional polymer article according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer and other organic materials may be incorporated into a variety of different optic and electro-optic devices and systems, including passive and active optics and electroactive devices. Lightweight and conformable, one or more polymer/organic solid layers may be incorporated into wearable devices such as smart glasses and are attractive candidates for emerging technologies including virtual reality/augmented reality devices where a comfortable, adjustable form factor is desired.

Virtual reality (VR) and augmented reality (AR) eyewear devices or headsets, for instance, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. VR/AR eyewear devices and headsets may be used for a variety of purposes. For example, governments may use such devices for military training, medical professionals may use such devices to simulate surgery, and engineers may use such devices as design visualization aids. During use, these and other devices and systems may be exposed to fluctuations in temperature, which may include exposure to elevated temperatures that adversely affect performance and/or the comfort of a user.

A variety of methods and techniques may be used to provide active and/or passive cooling for such devices and systems. For instance, and as will be appreciated, compression-based cooling methods may require an excessive amount of energy to be practicable for many applications. Other cooling approaches such as water-cooling typically include complicated designs and accessories, which would challenge their application in all-day wearable electronics such as smart glasses, AR glasses, VR headsets, smart watches, and the like.

Without wishing to be bound by theory, the all-day wearability of AR/VR glasses, for instance, may be predicated on their functionality and comfort under disparate solar loads, which may include operation both indoors (~0 W/m$^2$) and outdoors (~1000 W/m$^2$). As disclosed herein, passive cooling through material design may enable high cooling power by being reflective in the solar heating spectrum wavelengths (0.25-2.5 micrometers) and emissive in the long wavelength IR (8-14 micrometers). High reflectance across the solar heating spectrum may provide small energy absorption within the solar spectrum, while high emissivity within the long wavelength infrared (LWIR) allows the surface to radiate and exchange heat with the atmosphere.

Notwithstanding recent developments, it would be advantageous to provide mechanical and optical systems, including lenses and lens architectures, that are highly transparent and highly emissive, and which inhibit or even eliminate thermal throttling due to exposure to electromagnetic radiation. The present disclosure is thus generally directed to polymer layers including polymer bilayers and multilayers, and more specifically to polymer layer and bilayer architectures exhibiting a high solar spectrum reflectance, high transmissivity and high emissivity in the long-wavelength infrared (LWIR), a high effective modulus and yield strength, high thermal conductivity, and optionally RF transparency.

Example polymer bilayers (e.g., thin films) may include a porous fluoropolymer layer and a drawn ultra-high molecular weight polyethylene (UHMWPE) layer. The polymer bilayer structure can be configured as a foam (PVDF)/film (UHMWPE) structure, a foam (PVDF)/foam (UHMWPE)

structure, a foam (PVDF)/fiber-film (UHMWPE) structure, or even as a co-extruded core (PVDF foam)/shell (UHMWPE) fiber structure. In some embodiments, a PVDF foam layer may be supported by a PVDF film layer. A polymer bilayer may be formed by lamination and may include or constitute a laminate. As used herein, the terms "polymer thin film" and "polymer layer" may be used interchangeably. Furthermore, reference to a "polymer thin film" or a "polymer layer" may include reference to a "polymer bilayer" unless the context clearly indicates otherwise. Moreover, for the sake of convenience, particular embodiments may be described herein with reference to polyvinylidene fluoride (PVDF) or polyethylene (PE). However, it will be appreciated that embodiments directed at polyvinylidene fluoride or polyvinylidene fluoride thin films may be applicable to polyethylene or polyethylene thin films, and embodiments directed at polyethylene or polyethylene thin films may be applicable to polyvinylidene fluoride or polyvinylidene fluoride thin films.

The polymer bilayer may be co-integrated with a wearable device to provide a platform to achieve passive cooling during daytime use by combining high emissivity of the fluoropolymer and high transparency of UHMWPE in the LWIR region. Additionally, high thermal conductivity of the UHMWPE may decrease the propensity for thermal throttling by promoting thermal dispersion over a larger surface area of the device, which may increase thermal dissipation through convective heat transport.

According to some embodiments, the porous fluoropolymer may include a PVDF-based polymer, such as PVDF homopolymer, PVDF-CTFE, PVDF-HFP, PVDF-TFE, PVDF-TrFE, and PVDF-TrFE-TFE, as well as combinations and co-polymers thereof, where CTFE is chloro-trifluoro ethylene, HFP is hexafluoropropene, TFE is tetrafluoroethylene, and TrFE is trifluoroethylene.

In some embodiments, the porous fluoropolymer may be characterized by a porosity of at least approximately 15 vol. %, e.g., approximately 15, 20, 25, 30, 35, 40, 45, 50, 55 or 60 vol. %, including ranges between any of the foregoing values. An average pore size within the porous fluoropolymer may be at least approximately 100 nm, e.g., 100, 200, 500, or 1000 nm, including ranges between any of the foregoing values. A pore size distribution within the porous fluoropolymer layer may be monomodal, bimodal, or polydisperse.

The porous fluoropolymer may be formed using a foaming agent that is adapted to generate porosity within the fluoropolymer layer. Example foaming agents may include solid particles of azodicarbonamide (ADC), p,p'-oxybis-benzenesulfonyl hydrazide (OBSH), or sodium bicarbonate, as well as derivatives thereof. A further example foaming agent may include supercritical $CO_2$. In a further example process, the porous fluoropolymer may be formed by inversion phase separation of a polymer solution in a non-solvent bath.

In some embodiments, the fluoropolymer layer may be characterized by a solar spectrum reflectance of at least approximately 40%, e.g., 40, 60, 80, 90, 95, 98, or 99%, including ranges between any of the foregoing values, and a long-wavelength infrared emissivity of at least approximately 40%, e.g., 40, 60, 80, 90, 95, 98, or 99%, including ranges between any of the foregoing values.

The porous fluoropolymer may include high or ultra-high molecular weight polyvinylidene fluoride, for example. In some structures, the porous fluoropolymer layer may have a thickness ranging from approximately 0.2 mm to approximately 1.0 mm, and at least one areal dimension of at least approximately 1 cm.

The refractive index and thermoregulatory behavior of a polymer thin film, among other properties, may be determined by its chemical composition, the chemical structure of the polymer repeat unit, its density and extent of crystallinity, as well as the alignment of the crystals and/or polymer chains. Among these factors, the crystal or polymer chain alignment may dominate. In crystalline or semi-crystalline polymer thin films, the refractive index and the thermoregulatory behavior may be correlated to the degree or extent of crystal orientation, whereas the degree or extent of chain alignment may create a comparable response in an amorphous phase within a polymer thin film.

An applied stress may be used to create a preferred alignment of crystals or polymer chains within a polymer thin film and induce a corresponding modification of properties along different directions of the film. As disclosed further herein, during processing where a polymer thin film is stretched to induce a preferred alignment of crystals/polymer chains and an attendant modification of one or more thin film attributes, Applicants have shown that a gel casting method and the choice of an associated liquid solvent can decrease the propensity for polymer chain entanglement within the cast thin film.

In accordance with particular embodiments, Applicants have developed a polymer thin film manufacturing method for forming an optical quality and highly emissive PVDF-based polymer thin film having a desired thermoregulatory response. Whereas in PVDF and related polymers, the total extent of crystallization as well as the alignment of crystals may be limited due to polymer chain entanglement, as disclosed herein a gel casting method from a polymer solution may facilitate the disentanglement and alignment of polymer chains.

A polymer solution may include one or more crystallizable polymers, one or more additives, and one or more liquid solvents. Gel casting, which may provide control of one or more of the polymer composition and concentration, choice and concentration of liquid solvent, and casting temperature, for example, may facilitate decreased entanglement of polymer chains and allow the polymer film to achieve a higher stretch ratio during a later deformation step. In some cases, one or more low molecular weight additives may be added to the polymer solution. The molecular weight distribution of the one or more crystallizable polymers and the additive(s) may be respectively mono-disperse, bimodal, or polydisperse.

PVDF-based polymer thin films may be formed using a crystallizable polymer. Example crystallizable polymers may include moieties such as vinylidene fluoride (VDF), trifluoroethylene (TrFE), chlorotrifluoroethylene (CTFE), hexafluoropropene (HFP), and vinyl fluoride (VF). As used herein, one or more of the foregoing "PVDF-family" moieties may be combined with a low molecular weight additive to form an anisotropic polymer thin film. Reference herein to a PVDF thin film includes reference to any PVDF-family member-containing polymer thin film unless the context clearly indicates otherwise.

The crystallizable polymer component of such a PVDF thin film may have a molecular weight ("high molecular weight") of at least approximately 100,000 g/mol, e.g., at least approximately 100,000 g/mol, at least approximately 150,000 g/mol, at least approximately 200,000 g/mol, at least approximately 250,000 g/mol, at least approximately 300,000 g/mol, at least approximately 350,000 g/mol, at least approximately 400,000 g/mol, at least approximately 450,000 g/mol, or at least approximately 500,000 g/mol, including ranges between any of the foregoing values.

If provided, a "low molecular weight" additive may have a molecular weight of less than approximately 200,000 g/mol, e.g., less than approximately 200,000 g/mol, less than approximately 100,000 g/mol, less than approximately 50,000 g/mol, less than approximately 25,000 g/mol, less than approximately 10,000 g/mol, less than approximately 5000 g/mol, less than approximately 2000 g/mol, less than approximately 1000 g/mol, less than approximately 500 g/mol, less than approximately 200 g/mol, or less than approximately 100 g/mol, including ranges between any of the foregoing values.

Example low molecular weight additives may include monomers, oligomers and polymers of vinylidene fluoride (VDF), trifluoroethylene (TrFE), chlorotrifluoroethylene (CTFE), hexafluoropropene (HFP), and vinyl fluoride (VF), as well as homopolymers, co-polymers, tri-polymers, derivatives, and combinations thereof. Such additives may be readily soluble in, and provide refractive index matching with, the high molecular weight component. For example, a low molecular weight additive may have a refractive index measured at 652.9 nm of from approximately 1.38 to approximately 1.55.

The molecular weight of the low molecular weight additive may be less than the molecular weight of the crystallizable polymer. According to one example, the crystallizable polymer may have a molecular weight of at least approximately 100,000 g/mol and the additive may have a molecular weight of less than approximately 25,000 g/mol. According to a further example, the crystallizable polymer may have a molecular weight of at least approximately 300,000 g/mol and the additive may have a molecular weight of less than approximately 200,000 g/mol. According to a particular example, the crystallizable polymer may have a molecular weight of approximately 600,000 g/mol and the additive may have a molecular weight of approximately 150,000 g/mol. Use herein of the term molecular weight may, in some examples, refer to a weight average molecular weight.

Generally, a low molecular weight additive may constitute up to approximately 90 wt. % of the polymer thin film, e.g., approximately 0.001 wt. %, approximately 0.002 wt. %, approximately 0.005 wt. %, approximately 0.01 wt. %, approximately 0.02 wt. %, approximately 0.05 wt. %, approximately 0.1 wt. %, approximately 0.2 wt. %, approximately 0.5 wt. %, approximately 1 wt. %, approximately 2 wt. %, approximately 5 wt. %, approximately 10 wt. %, approximately 20 wt. %, approximately 30 wt. %, approximately 40 wt. %, approximately 50 wt. %, approximately 60 wt. %, approximately 70 wt. %, approximately 80 wt. %, or approximately 90 wt. %, including ranges between any of the foregoing values.

The choice of liquid solvent may affect the maximum crystallinity and percent beta phase content of a PVDF-based polymer thin film. In addition, the polarity of the solvent may impact the critical polymer concentration ($c^*$) for polymer chains to entangle in solution. The liquid solvent (i.e., "solvent") may include a single solvent composition or a mixture of different solvents. In some embodiments, the solubility of the crystallizable polymer in the liquid solvent may be at least approximately 0.1 g/100 g (e.g., 1 g/100 g or 10 g/100 g) at a temperature of 25° C. or more (e.g., 50° C., 75° C., 100° C., or 150° C.).

Example liquid solvents include, but are not limited to, dimethylformamide (DMF), cyclohexanone, dimethylacetamide (DMAc), diacetone alcohol, di-isobutyl ketone, tetramethyl urea, ethyl acetoacetate, dimethyl sulfoxide (DMSO), trimethyl phosphate, N-methyl-2-pyrrolidone (NMP), butyrolactone, isophorone, triethyl phosphate, carbitol acetate, propylene carbonate, glyceryl triacetate, dimethyl phthalate, acetone, tetrahydrofuran (THF), methyl ethyl ketone, methyl isobutyl ketone, glycol ethers, glycol ether esters, and N-butyl acetate.

A polymer gel may be obtained from the polymer solution by evaporating the solvent, cooling the polymer solution, adding a relatively poor solvent to the polymer solution, or a combination thereof. The solubility of the crystalline polymer in a poor solvent may be less than 20 g/100 g, e.g., 5 g/100 g or 1 g/100 g at a temperature of less than approximately 150° C., e.g., 75° C., 25° C., 0° C., −40° C., or −70° C. The polymer gel, which includes a mixture of the crystallizable polymer and the liquid solvent, may be transparent, translucent, or opaque. Following gelation and prior to further processing such as calendering, a polymer gel may be washed with a secondary solvent, which may replace the original solvent. A solvent evaporation step may be used to partially or completely remove the original solvent and/or the secondary solvent.

An anisotropic polymer thin film may be formed by applying a stress to the polymer gel, i.e., a polymer thin film containing the polymer gel. According to some examples, a solid state extrusion process may be used to orient the polymer chains and form a polymer thin film. According to further examples, a calendering process may be used to orient polymer chains in the gel at room temperature or at elevated temperature. The solvent may be partially or fully removed before, during, or after stretching and orienting.

A calendering process may be applied to the dried or partially dried gel before stretching. The gel may be calendered several times with a progressively decreasing roller gap to achieve a target thickness. During the calendering process, any residual solvent may be removed. The calendering process can be performed at room temperature and/or at a temperature no higher than approximately 150° C., e.g., 130° C., 110° C., 90° C., 70° C., or 50° C. The polymer may be stretched to a stretch ratio of at least approximately 1.5, e.g., 2, 2.5, 3, 3.5, 4, 4.5, 5, 5.5, 6, 7, 8, 9, 10, 15, 20, 30, or 50, including ranges between any of the foregoing values.

In an example process, a dried or substantially dried polymer material may be hot pressed to form a desired shape that is fed through a solid state extrusion system (i.e., extruder) at a suitable extrusion temperature. The temperature for hot pressing and the extrusion temperature may each be less than approximately 190° C. That is, the hot pressing temperature and the extrusion temperature may be independently selected from 180° C., 170° C., 160° C., 150° C., 140° C., 130° C., 120° C., 110° C., 100° C., 90° C., or 80° C., including ranges between any of the foregoing values. According to particular embodiments, the extruded polymer material may be stretched further, e.g., using a post-extrusion, uniaxial or biaxial stretch process. A solid state extruder may include a bifurcated nozzle, for example.

Stretching may include a single act of stretching or plural, successive stretching events, such as along different in-plane directions of a polymer thin film. The act of stretching may be velocity limited or strain rate limited. In some embodiments, a polymer thin film may be stretched at a variable or constant velocity. In some embodiments, the polymer thin film may be stretched using a variable strain rate or a constant strain rate (e.g., 0.5/sec, 1/sec, 5/sec, or 10/sec, including ranges between any of the foregoing values). By way of example, the strain rate may decrease throughout an act of stretching and/or amongst different stretching events from an initial strain rate (e.g., 5/sec) to a final strain rate (e.g., 0.5/sec).

Some stretching processes may include two successive stretching events. For instance, orthogonal consecutive stretching (OCS) may be used to develop structural fingerprints, such as smaller lamellar thicknesses and higher degrees of polymer chain orientation at draw ratios less than the draw ratios used to achieve similar structural fingerprints via comparative single stretching (SS) or parallel consecutive stretching (PCS) techniques. Orthogonal consecutive stretching may include first stretching a polymer thin film along a first in-plane axis, and then subsequently stretching the polymer thin film along a second in-plane axis that is orthogonal to the first in-plane axis.

In an example method, a cast polymer thin film may be stretched along a first in-plane axis to a stretch ratio of up to approximately 4 (e.g., 2, 3, or 4, including ranges between any of the foregoing values) with an attendant relaxation in the cross-stretch direction having a relaxation ratio of at least approximately 0.2 (e.g., 0.2, 0.3, 0.4, or 0.5, including ranges between any of the foregoing values). Subsequently, the polymer thin film may be stretched along a second in-plane axis orthogonal to the first in-plane axis to a stretch ratio of at least approximately 7 (e.g., 7, 10, 20, 30, 40, 50, or 60, including ranges between any of the foregoing values) with a relaxation ratio in the cross-stretch direction of at least approximately 0.2 (e.g., 0.2, 0.3, 0.4, or 0.5, including ranges between any of the foregoing values).

In some examples, the draw ratio in the first stretching step may be less than the draw ratio in the second stretching step. According to further embodiments, the temperature of the polymer thin film during the second stretching step may be greater than the polymer thin film temperature during the first stretching step. The temperature during the second stretching step may be at least approximately 5° C. greater than the temperature during the first stretching step (e.g., 5, 10, 15, or 20° C. greater, including ranges between any of the foregoing values).

In some embodiments, a PVDF polymer thin film may be heated and stretched along a first direction, cooled, and then heated and stretched along a second direction. In some embodiments, a polymer thin film may be heated and stretched along a first direction, cooled, and then heated and stretched again along the first direction. Following the second stretching step, the PVDF polymer thin film may be cooled. The acts of cooling may immediately follow the first (or second) stretching steps, where the polymer thin film may be cooled within approximately 10 seconds following completion of the first (or second) stretching step.

Cooling may stabilize the microstructure of the stretched polymer thin film. In some examples, the temperature of the polymer thin film during an act of stretching may be greater than the glass transition temperature of the crystallizable polymer. In some examples, the temperature of the polymer thin film during an act of stretching may be less than, equal to, or greater than the melting onset temperature of the crystallizable polymer.

In various examples, the extent of relaxation perpendicular to the stretch direction may be approximately equal to the square root of the stretch ratio in the stretch direction. In some embodiments, the extent of relaxation may be substantially constant throughout the stretching process(es). In further embodiments, the extent of relaxation may decrease, with greater relaxation associated with the beginning of a stretch step and lesser relaxation associated with the end of a stretch step.

After extrusion or casting, a PVDF film may be oriented either uniaxially or biaxially as a single layer or multilayer to form an anisotropic and optically clear film. An anisotropic polymer thin film may be formed using a thin film orientation system configured to heat and stretch a polymer thin film in at least one in-plane direction in one or more distinct regions thereof. In some embodiments, a thin film orientation system may be configured to stretch a polymer thin film, i.e., a crystallizable polymer thin film, along only one in-plane direction. For instance, a thin film orientation system may be configured to apply an in-plane stress to a polymer thin film along the x-direction while allowing the thin film to relax along an orthogonal in-plane direction (e.g., along the y-direction). As used herein, the relaxation of a polymer thin film may, in certain examples, accompany the absence of an applied stress along a relaxation direction.

According to some embodiments, within an example orientation system, a polymer thin film may be heated and stretched transversely to a direction of film travel through the system. In such embodiments, a polymer thin film may be held along opposing edges by plural movable clips slidably disposed along a diverging track system such that the polymer thin film is stretched in a transverse direction (TD) as it moves along a machine direction (MD) through heating and deformation zones of the thin film orientation system. In some embodiments, the stretching rate in the transverse direction and the relaxation rate in the machine direction may be independently and locally controlled. In certain embodiments, large scale production may be enabled, for example, using a roll-to-roll manufacturing platform.

In certain aspects, the tensile stress may be applied uniformly or non-uniformly along a lengthwise or widthwise dimension of the polymer thin film. Heating of the polymer thin film may accompany the application of the tensile stress. For instance, a semi-crystalline PVDF polymer thin film may be heated to a temperature greater than room temperature (~23° C.) to facilitate deformation of the thin film and the formation and realignment of crystals and/or polymer chains therein.

The temperature of the polymer thin film may be maintained at a desired value or within a desired range before, during and/or after the act of stretching, i.e., within a pre-heating zone or a deformation zone downstream of the pre-heating zone, in order to improve the deformability of the polymer thin film relative to an un-heated polymer thin film. The temperature of the polymer thin film within a deformation zone may be less than, equal to, or greater than the temperature of the polymer thin film within a pre-heating zone.

In some embodiments, the polymer thin film may be heated to a constant temperature throughout the act of stretching. In some embodiments, a region of the polymer thin film may be heated to different temperatures, i.e., during and/or subsequent to the application of a tensile stress. In some embodiments, different regions of the polymer thin film may be heated to different temperatures. In certain embodiments, the strain realized in response to the applied tensile stress may be at least approximately 20%, e.g., approximately 20%, approximately 50%, approximately 100%, approximately 200%, approximately 400%, approximately 500%, approximately 1000%, approximately 2000%, approximately 3000%, or approximately 4000% or more, including ranges between any of the foregoing values.

Following the act(s) of stretching, one or more thin film properties may be refined through hot pressing or hot calendering. Uniaxial hot pressing, for example, may be performed in a rigid die with loading applied along a common axis. Some pressing systems may include a graphite die, which may be enclosed in a protective atmosphere or vacuum chamber. During hot pressing, temperature and pressure may be applied simultaneously to the stretched polymer thin film. Heating may be achieved using induction coils that surround the graphite die, and pressure may be applied hydraulically. Calendering is a process of compressing a thin film during production by passing a polymer thin film between one or more pairs of heated rollers.

In some embodiments, a stretched polymer thin film may be pressed or calendered to at least approximately 50% of its initial thickness (e.g., 50%, 60%, 70%, or 80% of its initial thickness, including ranges between any of the foregoing values) under an applied pressure of at least approximately 2 MPa (e.g., 2, 3, 4, 5, or 10 MPa, including ranges between any of the foregoing values) and at a temperature of less than approximately 140° C. (e.g., 120° C., 125° C., 130° C., or 135° C., including ranges between any of the foregoing values).

A pressed or calendered polymer thin film may have a thickness of less than approximately 500 micrometers, e.g., less than 400 micrometers, less than 300 micrometers, or less than 200 micrometers. According to some embodiments, following hot pressing or hot calendering, a polymer thin film may be stretched further using one or more additional stretching steps. In a post-hot pressing or post-hot calendering stretching step, a polymer thin film may be stretched to a draw ratio of approximately 5 or greater (e.g., 5, 10, 20, 40, 60, 80, 100, 120, or 140, including ranges between any of the foregoing values).

Hot pressing or hot calendering may increase the transmissivity of a polymer thin film and lessen haze. According to some embodiments, the applied pressure may collapse voids within the polymer thin film, thus decreasing the overall void volume and increasing the density of the polymer matrix.

Following deformation of the polymer thin film, the heating may be maintained for a predetermined amount of time, followed by cooling of the polymer thin film. The act of cooling may include allowing the polymer thin film to cool naturally, at a set cooling rate, or by quenching, such as by purging with a low temperature gas, which may thermally stabilize the polymer thin film. During an act of cooling, a polymer thin film may relax by approximately 5% or more, e.g., approximate 10%.

Following deformation, the crystals or chains may be at least partially aligned with the direction of the applied tensile stress. As such, a polymer thin film may exhibit a high degree of optical clarity and mechanical anisotropy.

The presently disclosed anisotropic PVDF-based polymer thin films may be characterized as optical quality polymer thin films and may form, or be incorporated into, an optical element such as an actuatable layer. Optical elements may be used in various display devices, such as virtual reality (VR) and augmented reality (AR) glasses and headsets.

According to various embodiments, an "optical quality" thin film may, in some examples, be characterized by a transmissivity within the visible light spectrum of at least approximately 20%, e.g., 20, 30, 40, 50, 60, 70, 80, 90 or 95%, including ranges between any of the foregoing values, and less than approximately 10% bulk haze, e.g., 0, 1, 2, 4, 6, or 8% bulk haze, including ranges between any of the foregoing values. Transparent materials will typically exhibit very low optical absorption and minimal optical scattering.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces of the material. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

According to some embodiments, the areal dimensions (i.e., length and width) of an anisotropic PVDF-family polymer thin film may independently range from approximately 5 cm to approximately 50 cm or more, e.g., 5, 10, 20, 30, 40, or 50 cm, including ranges between any of the foregoing values. Example anisotropic polymer thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

In accordance with various embodiments, a polymer composition used to form an anisotropic polymer thin film may include a crystallizable polymer and a low molecular weight additive. Without wishing to be bound by theory, one or more low molecular weight additives may interact with high molecular weight polymers throughout casting and stretch processes to facilitate less chain entanglement and better chain alignment and, in some examples, create a higher crystalline content within the polymer thin film.

In some examples, a composition having a bimodal molecular weight distribution may be cast to form a thin film, which may be stretched to induce mechanical and piezoelectric anisotropy through crystal and/or chain realignment. Stretching may include the application of a uniaxial stress or a biaxial stress. In some embodiments, the application of an in-plane biaxial stress may be performed simultaneously or sequentially. In some embodiments, the low molecular weight additive may beneficially decrease the stretching temperature needed to achieve crystal and/or chain realignment. In some embodiments, a polymer thin film may be stretched by calendering, solid state extrusion, and/or a combination of thereof.

In accordance with various embodiments, an anisotropic PVDF-based polymer thin film may be formed by applying a desired stress state to a crystallizable polymer thin film. A polymer composition capable of crystallizing may be formed into a single layer using appropriate gel casting operations. For example, a vinylidene fluoride-containing composition may be cast and oriented as a single layer to form a mechanically and/or optically anisotropic thin film. According to further embodiments, a crystallizable polymer may be cast to form a thin film and such a thin film may be laminated to form a bilayer structure.

In some embodiments, a polymer thin film having a bimodal molecular weight distribution may be stretched to a larger stretch ratio than a comparative polymer thin film (i.e., lacking a low molecular weight additive). In some examples, a stretch ratio may be greater than 4, e.g., 5, 10, 20, 40, or more. The act of stretching may include a single stretching step or plural (i.e., successive) stretching steps where one or more of a stretching temperature and a strain rate may be independently controlled.

In example methods, the polymer thin film may be heated during stretching to a temperature of from approximately 60° C. to approximately 170° C. and stretched at a strain rate of from approximately 0.1%/sec to approximately 300%/sec. Moreover, one or both of the temperature and the strain rate may be held constant or varied during an act of stretching. For instance, a polymer thin film may be stretched at a first temperature and a first strain rate (e.g., 130° C. and 50%/sec) to achieve a first stretch ratio. Subsequently, the temperature of the polymer thin film may be increased, and the strain rate may be decreased to a second temperature and a second strain rate (e.g., 165° C. and 5%/sec) to achieve a second stretch ratio.

Such a stretched polymer thin film may exhibit higher crystallinity and a higher elastic modulus. By way of example, an oriented polymer thin film having a bimodal molecular weight distribution may have an in-plane elastic modulus greater than approximately 2 GPa, e.g., 3, 5, 10, 12, or 15 GPa, including ranges between any of the foregoing value.

According to some embodiments, the crystalline content of an anisotropic polymer thin film may include crystals of poly(vinylidene fluoride), poly(trifluoroethylene), poly(chlorotrifluoroethylene), poly(hexafluoropropene), and/or poly(vinyl fluoride), for example, although further crystalline polymer materials are contemplated, where a crystalline phase in a "crystalline" or "semi-crystalline" polymer thin film may, in some examples, constitute at least approximately 1% of the polymer thin film. For instance, the crystalline content (e.g., beta phase content) of a polymer thin film may be at least approximately 1%, e.g., 1, 2, 4, 10, 20, 40, 60, or 80%, including ranges between any of the foregoing values.

In some embodiments, following stretching, the polymer thin film may be annealed. Annealing may be performed at a fixed or variable stretch ratio and/or a fixed or variable applied stress. An example annealing temperature may be greater than approximately 80° C., e.g., 100° C., 130° C., 150° C., 170° C., or 190° C., including ranges between any of the foregoing values. Without wishing to be bound by theory, annealing may stabilize the orientation of polymer chains and decrease the propensity for shrinkage of the polymer thin film.

Following deformation, the crystals or chains may be at least partially aligned with the direction of the applied tensile stress. As such, a polymer thin film may exhibit a high degree of birefringence, a high degree of optical clarity, bulk haze of less than approximately 10%, a high piezoelectric coefficient, e.g., $d_{31}$ greater than approximately 5 pC/N and/or a high electromechanical coupling factor, e.g., $k_{31}$ greater than approximately 0.1.

In example experiments, PVDF resin was dissolved completely in various liquid solvents, including DMF, cyclohexanone (CH), and mixtures of DMF and cyclohexanone. In one example, a 10 wt. % solution of PVDF in DMF was prepared under constant stirring at 60° C. (Sample 1). In a further example, a 10 wt. % solution of PVDF in cyclohexanone was prepared under constant stirring at 90° C. (Sample 4). A 50-50 w/w solvent mixture of DMF and cyclohexanone was used to prepare further 10 wt. % resin solutions under constant stirring at 80° C. (Samples 2 and 3).

The respective Samples 1-4 were maintained at the target temperature under constant stirring for 3 hr until the solution was clear. The solutions were then poured into separate vessels and allowed to form a gel over a period of approximately 1 hr. Following gelation, the gels were washed with methanol (5×) to remove residual solvent. The washed gels were stored in a fume hood overnight to evaporate the methanol and obtain a dry, white gel.

Successive calendering steps at room temperature were used to process the dried gels, where the roller gap was decreased with each successive pass through the calendering apparatus. Transparent thin films were obtained with stretch ratios ranging from approximately 2 to approximately 5.

The calendered polymer thin films were heated, stretched, and then measured for crystalline content. The act of stretching included locally heating the thin film samples to 140° C., initiating an applied stress, and increasing the temperature at a rate of 5° C./min to a target stretch temperature of approximately 160° C. until reaching an applied stress of 250 MPa, whereupon the thin film temperature was increased further at a rate of 1° C./min to 170° C. while maintaining the 250 MPa stress. The stretch ratio was between 10 and 12. Unannealed thin films were then cooled to less than 40° C. prior to removing the applied stress.

In some embodiments, a stretched thin film may be annealed. For example, after reaching a temperature of 170° C., the temperature may be increased further at a rate of 0.5° C./min to an annealing temperature of 195° C. under a constant applied stress of 250 MPa. The samples may be maintained at 195° C. for 40 min. The annealing process may increase the stretch ratio to values greater than 12, e.g., from 12 to 15. An annealed sample may be cooled to less than 40° C. prior to removing the applied stress.

After cooling, total crystallinity was measured using differential scanning calorimetry (DSC), and the relative beta phase ratio was determined using Fourier Transform Infrared Spectroscopy (FTIR). The absolute beta crystallinity was calculated as the product of the total crystallinity and the relative beta ratio. The modulus (i.e., storage modulus) was measured by dynamic mechanical analysis (DMA). The data in Table 1 indicate that a gel cast using a poor solvent (Sample 4) can achieve a higher modulus after stretching than a gel cast using a good solvent (Sample 1). In addition, annealing may increase both the total crystalline content and the modulus of a stretched thin film (Sample 2 and Sample 3).

TABLE 1

Effect of Solvent and Annealing on PVDF Thin Film Properties

| Sample | Solvent | Annealing? | Relative Beta % | Total Crystallinity % | Absolute Beta Crystallinity % | Modulus (GPa) |
|---|---|---|---|---|---|---|
| 1 | DMF | N | 97 | 61 | 59 | 5.1 |
| 2 | DMF:CH | N | 90 | 66 | 59 | 6.5 |
| 3 | DMF:CH | Y | 80 | 81 | 65 | 7.5 |
| 4 | CH | N | 96 | 69 | 66 | 10.3 |

In some examples, the applied stress during stretching may range from approximately 100 MPa to approximately 500 MPa, e.g., 100, 150, 200, 250, 300, 350, 400, 450, or 500 MPa, including ranges between any of the foregoing values. In a further example experiment where cyclohexane was used as a solvent, the thin film was stretched at a maximum applied stress of approximately 400 MPa.

In accordance with various embodiments, anisotropic polymer thin films may include fibrous, amorphous, partially crystalline, or wholly crystalline materials. Such materials may also be mechanically anisotropic, where one or more characteristics may include compressive strength, tensile strength, shear strength, yield strength, stiffness, hardness, toughness, ductility, machinability, thermal expansion, piezoelectric response, and creep behavior may be directionally dependent.

A polymer composition having a bimodal molecular weight may be formed into a single layer using casting operations. Alternatively, a polymer composition having a bimodal molecular weight may be cast with other polymers or other non-polymer materials to form a multilayer polymer thin film. The application of a uniaxial or biaxial stress to a gel cast single or multilayer thin film may be used to align polymer chains and/or re-orient crystals to induce mechanical, optical, and/or thermoregulatory anisotropy therein.

The crystallizable polymer and the low molecular weight additive may be independently selected to include vinylidene fluoride (VDF), trifluoroethylene (TrFE), chloride trifluoride ethylene (CTFE), hexafluoropropene (HFP), vinyl fluoride (VF), as well as homopolymers, co-polymers, tri-polymers, derivatives, and combinations thereof. The high molecular weight component of the polymer thin film may have a molecular weight of at least 100,000 g/mol, whereas the low molecular weight additive may have a molecular weight of less than 200,000 g/mol and may constitute 0.1 wt. % to 90 wt. % of the polymer thin film.

The polyethylene layer may include "ultra-high" molecular weight polyethylene (UHMWPE) and may be characterized by a molecular weight of at least approximately 300,000 g/mol, e.g., at least approximately 300,000 g/mol, at least approximately 500,000 g/mol, at least approximately 1,000,000 g/mol, at least approximately 2,000,000 g/mol, or at least approximately 5,000,000 g/mol, including ranges between any of the foregoing values.

In further embodiments, the polyethylene layer may include a low molecular weight wax, e.g., 50 wt. % or more of a low molecular weight wax. In some embodiments, the polyethylene layer may have a thickness ranging from approximately 10 micrometers to approximately 1 mm, and at least one areal dimension of at least approximately 1 cm. In example polymer bilayers, a thickness of the polyethylene layer may be less than a thickness of the porous fluoropolymer layer.

The polyethylene layer may be dense or porous. A porous polyethylene layer may be characterized by a porosity of at least approximately 1 vol. %, e.g., approximately 1, 2, 4, 10, 15, 20, 25, 30, 35, 40, 45, 50, 55 or 60 vol. %, including ranges between any of the foregoing values. The average pore size within a porous polyethylene layer may be at least approximately 50 nm, e.g., 50, 100, 200, or 500 nm, including ranges between any of the foregoing values, and the pore size distribution within a polyethylene layer may be monomodal, bimodal, or polydisperse.

The polyethylene layer may include an antioxidant. Example antioxidants may include hindered phenols, phosphites, thiosynergists, hydroxylamines, and oligomers of hindered amine light stabilizers (HALS).

The polyethylene layer may include a pigment. Example pigments may include nanoscale particles (e.g., having an average particle size of less than approximately 200 nm, e.g., less than 200 nm, less than 100 nm, or less than 50 nm, including ranges between any of the foregoing values) and may include, for example, organic dyes such as Sudan Blue, Sudan Red, or Sudan Black, metal oxides such as chromium iron oxide, and Perylene Black. In some embodiments, such IR reflective pigments may be incorporated into an IR reflective layer such as a layer of an IR reflective paint that overlies the polyethylene layer.

In some embodiments, the polyethylene layer may be characterized by a near-infrared reflectance of at least approximately 40%, e.g., at least 40, 60, or 80%, including ranges between any of the foregoing values. In some embodiments, the polyethylene layer may be characterized by a long-wavelength infrared transmissivity of at least approximately 40%, e.g., at least 40, 60, or 80%, including ranges between any of the foregoing values.

In some embodiments, the polyethylene layer may be characterized by a thermal conductivity of at least approximately 5 W/mK, e.g., 5, 10, 15, 20, or 25 W/mK, including ranges between any of the foregoing values.

In some embodiments, the polyethylene layer may be characterized by a Young's modulus of at least approximately 2 GPa, e.g., 2, 5, 10, 20, 50, 100, or 150 GPa, including ranges between any of the foregoing values, and a tensile strength of at least approximately 0.7 GPa, e.g., 0.7, 1, 2, or 3 GPa, including ranges between any of the foregoing values.

According to various methods, the fluoropolymer and polyethylene layers may be formed co-continuously or separately. In the latter case, fluoropolymer and polyethylene thin films having a high or an ultra-high molecular weight may be independently stretched to a draw ratio of at least 5, and then laminated, e.g., using an optically clear adhesive or a pressure sensitive adhesive to form a polymer bilayer. Example adhesives may be acrylic or epoxy based.

An example method includes forming a first layer including a porous fluoropolymer and forming a second layer including polyethylene directly over the first layer to form a polymer bilayer. In some embodiments, a polymer bilayer may be formed into a compound curvature.

Polymer thin films may be formed using casting operations such as melt extrusion, compression molding, solvent casting, gel casting, and the like. Applicants have demonstrated that enhanced drawability may be achieved by tuning one or more of the draw temperature and the draw rate of a cast polymer thin film. In some examples, the draw temperature may be correlated to the thin film's primary (glass, or alpha) relaxation and/or its low temperature (beta) relaxation.

In some embodiments, a polymer such as polyethylene may be provided in particulate or powder form. Example polyethylene powders may have a particle size distribution (d90) greater than approximately 50 micrometers, e.g., greater than 50, 100, 200, or 300 micrometers, including ranges between any of the foregoing values.

A low molecular weight additive, if used, may be provided in particulate or powder form, and may have a particle size distribution (d90) less than approximately 30 micrometers, e.g., 5, 10, 15, 20, or 25 micrometers, including ranges between any of the foregoing values. An additive may include a wax or waxy material, for example.

In some embodiments, particulate or powdered polyethylene may be mixed with a particulate or powdered wax in a continuous mixer (LCM) at any suitable temperature. For instance, a mixing temperature may be less than, equal to, or greater than a melting temperature of the wax (additive). The mixing may be adapted to impregnate the polyethylene with the wax to form a homogeneous mixture prior to casting.

In some examples, a mixture of "unentangled" polyethylene and low molecular weight additive may be extruded at a temperature less than approximately 140° C. (e.g., 120° C. or 130° C.) and above the melting point of the additive to form a polymer thin film. For instance, a mixture may be extruded as a paste (i.e., paste extrusion) at a temperature less than a melting temperature of unentangled polyethylene. An extruded thin film may have a thickness of less than approximately 2 mm (e.g., 500 micrometers, 750 micrometers, or 1 mm, including ranges between any of the foregoing values) and a porosity of less than approximately 10% (e.g., less than 5%, less than 2%, or less than 1%). In some embodiments, "unentangled polyethylene" may refer to high molecular weight polyethylene having an entanglement density less than an entanglement density at equilibrium, such as from approximately 10% to approximately 80% of the equilibrium entanglement density, e.g., 10, 20, 30, 40, 50, 60, 70, or 80% of the equilibrium entanglement density, including ranges between any of the foregoing values.

In example melt extrusion methods, the melt may undergo pre-orientation with a draw down ratio (DDR) of at least approximately 1, e.g., approximately 1, approximately 2, approximately 3, or approximately 4, including ranges between any of the foregoing values. The melt may be collected on a chilled roller. The roller temperature may be less than (e.g., at least approximately 10° C. less than) the lowest melting point of any additive included in the melt. The cast polymer may undergo a machine direction orientation (MDO) process to form a hard cast film having a draw ratio along the machine direction (MDX) of at least approximately 2, e.g., at least approximately 2, at least approximately 4, or at least approximately 6, including ranges between any of the foregoing values.

According to further embodiments, a polymer thin film may be formed via gel casting from a dilute solution including a polymer composition and a first solvent followed by removal of the solvent. Example solvents include poor solvents such as mineral oils, paraffin oil, stearic acid, p-xylene, dodecanol, and the like. The first solvent may be removed prior to, during, and/or after the act(s) of stretching. The first solvent may be removed directly by evaporation, or through contact with a miscible second solvent followed by evaporation of the resulting co-solvent.

A cast polymer thin film may be stretched using single or multiple stretching events. Some stretching processes may include two successive stretching events. For instance, orthogonal consecutive stretching (OCS) may be used to develop structural fingerprints, such as smaller lamellar thicknesses and higher degrees of polymer chain orientation at draw ratios less than the draw ratios used to achieve similar structural fingerprints via comparative single stretching (SS) or parallel consecutive stretching (PCS) techniques. Orthogonal consecutive stretching may include first stretching a polymer thin film along a first in-plane axis, and then subsequently stretching the polymer thin film along a second in-plane axis that is orthogonal to the first in-plane axis.

In an example OCS method, a cast polymer thin film may be stretched along a first in-plane axis to a stretch ratio of up to approximately 4 (e.g., 2, 3, or 4, including ranges between any of the foregoing values) with an attendant relaxation in the cross-stretch direction having a relaxation ratio of at least approximately 0.2 (e.g., 0.2, 0.3, 0.4, or 0.5, including ranges between any of the foregoing values). Subsequently, the polymer thin film may be stretched along a second in-plane axis orthogonal to the first in-plane axis to a stretch ratio of at least approximately 7 (e.g., 7, 10, 20, 30, 40, 50, or 60, including ranges between any of the foregoing values) with a relaxation ratio in the cross-stretch direction of at least approximately 0.2 (e.g., 0.2, 0.3, 0.4, or 0.5, including ranges between any of the foregoing values).

In some examples, the draw ratio in the first stretching step may be less than the draw ratio in the second stretching step. According to further embodiments, the temperature of the polymer thin film during the second stretching step may be greater than the polymer thin film temperature during the first stretching step. For instance, the temperature during the second stretching step may be at least approximately 5° C. greater than the temperature during the first stretching step (e.g., 5, 10, 15, or 20° C. greater, including ranges between any of the foregoing values).

In some embodiments, a polyethylene thin film may be heated and stretched along a first direction, cooled, and then heated and stretched along a second direction. In some embodiments, a polymer thin film may be heated and stretched along a first direction, cooled, and then heated and stretched again along the first direction. Following the second stretching step, the polyethylene thin film may be cooled. The acts of cooling may immediately follow the first (or second) stretching steps, where the polyethylene thin film may be cooled within approximately 10 seconds following completion of the first (or second) stretching step. In some examples, the temperature of the polymer thin film during an act of stretching may be greater than the glass transition temperature of the polymer. In some examples, the temperature of the polymer thin film during an act of stretching may be less than, equal to, or greater than the melting onset temperature of the polymer.

An example polymer may include ultra-high molecular weight polyethylene (UHMWPE). According to some embodiments, the optical properties of UHMWPE may be improved in conjunction with the processing methods disclosed herein by decreasing or eliminating surface and/or bulk defects. In some embodiments, one or more low melting point additives may be incorporated into the polymer matrix of a polymer thin film.

Example polyethylene materials include high molecular weight polyethylene, high density polyethylene, ultra-high molecular weight polyethylene, as well as derivatives and mixtures thereof, and may have a molecular weight (e.g., weight-averaged molecular weight) of at least approximately 100,000 g/mol, e.g., at least approximately 100,000 g/mol, or at least approximately 250,000 g/mol. Ultra-high molecular weight polyethylene may have a molecular weight of at least approximately 300,000 g/mol, e.g., approximately 300,000 g/mol, approximately 400,000 g/mol, approximately 500,000 g/mol, approximately 600,000 g/mol, approximately 700,000 g/mol, approximately 800,000 g/mol, approximately 900,000 g/mol, approximately 1,000,000 g/mol, approximately 2,000,000 g/mol, or approximately 5,000,000 g/mol, including ranges between any of the foregoing values.

In some embodiments, a polymer thin film that includes high molecular weight polyethylene may additionally include from approximately 5 wt. % to approximately 50 wt. % (e.g., approximately 5 wt. %, approximately 10 wt. %, approximately 20 wt. %, or approximately 50 wt. %, including ranges between any of the foregoing values) of a secondary polymer having a molecular weight of less than approximately 50,000 g/mol (e.g., less than approximately 50,000 g/mol, less than approximately 20,000 g/mol, or less than approximately 10,000 g/mol, including ranges between any of the foregoing values).

In some embodiments, a polymer thin film may include a low molecular weight additive. The additive may include a low molecular weight polyethylene or polyethylene oligomer and may constitute from approximately 1 wt. % to approximately 90 wt. % of the polymer matrix forming the polymer thin film. Additives may have good solubility in, and may be index matched with, high molecular weight polyethylene, high density polyethylene, or ultra-high molecular weight polyethylene.

Example additives may include one or more of hydrocarbon waxes, e.g., polyethylene-wax molecules or amide waxes, mineral oils, fluoropolymers, etc. If used, polyethylene-wax molecules may have a molecular weight of at least approximately 400 g/mol, e.g., 400, 1000, 2000, or 3000 g/mol, including ranges between any of the foregoing values. The wax content may be at least approximately 2 wt. %, e.g., 2, 5, 10, 20, 50, or 80 wt. %, including ranges between any of the foregoing values. Suitable mineral oils may have a molecular weight of at least approximately 200 g/mol, e.g., 200, 400, or 600 g/mol, including ranges between any of the foregoing values. In some embodiments, up to approximately 1000 ppm (e.g., 200, 400, 600, 800, or 1000 ppm) of a fluoropolymer or other processing aid may be incorporated into the polymer matrix. An additive may be characterized by a refractive index of approximately 1.5 to approximately 1.6, e.g., 1.55.

In some embodiments, an additive incorporated into the polymer matrix may include a photothermal dye. Example photothermal dyes include 2-(2H-benzotriazol-2-yl)-4,6-di-tert-pentylphenol (BZT), azobenzene, coronatine dye, graphene, quaterrylene-based dyes, and metal nanoparticles such as gold nanoparticles, as well as mixtures thereof. A photothermal dye such as azobenzene or metal nanoparticles may be functionalized by ethylene oligomers having a molecular weight of at least approximately 500 g/mol, e.g., 500, 1000, 2000, or 3000 g/mol, including ranges between any of the foregoing values. In some examples, a concentration of a photothermal additive within the polymer matrix may be at least approximately 0.5 wt. %, e.g., 0.5, 1, 2, or 5 wt. %, including ranges between any of the foregoing values. A functionalized photothermal dye may be added to polyethylene prior to or during formation of a thin film, which may be stretched to form a dichroic arrangement of dye in the polyethylene matrix.

In some embodiments, optical and mechanical properties may be specifically targeted, and the polymer thin film may contain approximately 60 wt. % to approximately 90 wt. % of a low molecular weight polyethylene or polyethylene oligomer. In some embodiments, thermal conductivity may be specifically targeted, and the polymer thin film may contain approximately 1 wt. % to approximately 10 wt. % of a low molecular weight polyethylene or polyethylene oligomer.

A thermally conductive additive may have a thermal conductivity of at least approximately 5 W/mK, e.g., 5, 10, 15, 20, 25, 30, 35, 40, 45, 50 W/mK or more, including ranges between any of the foregoing values. Example thermally conductive additives include graphene, borophene, boron nitride (hexagonal-BN), carbon nanotubes, silver nanowires, and metal nanoparticles, such as high aspect ratio metallic nanoparticles. According to some embodiments, the loading of a thermally conductive additive may range from approximately 0.01 wt. % to approximately 1 wt. %. By way of example, phenolic benzotriazoles can form π-π interactions with polymer chains in the polyethylene polymer and enable phonons to pass at extremely low loading amounts without affecting optical quality.

The low molecular weight additive may have a molecular weight of less than approximately 4,000 g/mol, e.g., less than approximately 4,000 g/mol, less than approximately 2,000 g/mol, less than approximately 1,000 g/mol, less than approximately 500 g/mol, or less than approximately 200 g/mol. An example low molecular weight additive may be characterized by a melting temperature ($T_m$) of at least approximately 40° C., e.g., approximately 40° C., approximately 60° C., approximately 80° C., approximately 100° C., or approximately 120° C., including ranges between any of the foregoing values. Reference herein to a melting temperature ($T_m$) may include reference to a temperature corresponding to the onset of melting.

Example polyethylene polymer and oligomer-based additives may include a reactive group such as vinyl, acrylate, methacrylate, epoxy, isocyanate, hydroxyl, amine, and the like. Such additives may be cured in situ, i.e., within a polymer thin film by applying one or more of heat or light, or by reaction with a suitable catalyst.

In some embodiments, plural additives may be used. According to particular embodiments, an original additive can be used during processing of a thin film (e.g., during extrusion, stretching, and/or calendaring). Thereafter, the original additive may be removed such as by washing or evaporation and replaced by a secondary additive. A secondary additive (e.g., various phenolic benzotriazoles) may be index matched to the crystalline polyethylene polymer and may, for example, have a refractive index ranging from approximately 1.45 to approximately 1.6. A secondary additive can be added by soaking the thin film under melting conditions or in a solvent bath. A secondary additive may have a melting point of less than approximately 100° C.

A secondary additive, if used, may be a poor solvent to polyethylene. Example poor solvents may include stearic acid or saturated hydrocarbons such as mineral oils (e.g., Kaydol° mineral oil, paraffin oil, Primol™ oil, and the like). The secondary additive may be removed before, during, or after a film stretching process such as by evaporation or solvent exchange.

In some embodiments, the polyethylene layer could include a matted layer, e.g., a fibrous polyethylene mat, such as a knit, woven, or non-woven mat formed from ultra-high molecular weight polyethylene fibers. For instance, a matted polyethylene layer may be formed using vacuum compression molding of PE fibers. Example processing conditions for vacuum compression molding include an applied pressure of at least approximately 200 bar (e.g., 200, 500, 1000, 2000, or 4000 bar, including ranges between any of the foregoing values) and an applied temperature of at least approximately 120° C. (e.g., 120, 130, 140, 150, or 160° C., including ranges between any of the foregoing values) for a suitable time.

According to further examples, a non-woven PE layer may include a fibrous mat where the mat is knit from UHMWPE fibers and then consolidated under elevated pressure (e.g., 10, 20, 40, or 60 bar) and high temperature (e.g., 60, 80, 100, 120, or 140° C.). Prior to consolidation, polyethylene fibers may be coated with unentangled PE powder, where the extent of surface coverage of the powder may range from approximately 10 g/m$^2$ to approximately 100 g/m$^2$, e.g., 10, 20, 40, or 100 g/m$^2$).

The presently disclosed polyethylene thin films may be characterized as optical quality polymer thin films and may form, or be incorporated into, an optical element. Such optical elements may be used in various display devices, such as virtual reality (VR), augmented reality (AR), and mixed reality (MR) glasses and headsets. The efficiency of these and other optical elements may depend on the degree of optical clarity and/or one or more mechanical properties of the polymer thin film.

A material or element that is "transparent" or "optically transparent" may, for a given thickness, have a transmissivity within the visible light (e.g., 380-750 nm) and/or RF (e.g., 2-20 GHz) spectra of at least approximately 85%, e.g., approximately 85, 90, 95, 97, 98, 99, or 99.5%, including ranges between any of the foregoing values, and less than approximately 5% bulk haze, e.g., approximately 0.1, 0.2, 0.5, 1, 2, or 5% bulk haze, including ranges between any of the foregoing values. Transparent materials will typically exhibit very low optical absorption and minimal optical scattering.

After extrusion or casting, a polyethylene film can be oriented either uniaxially or biaxially as a single layer to form a mechanically anisotropic and optically clear film that may exhibit anisotropy also in its thermal conductivity. An anisotropic polymer thin film may be formed using a thin film orientation system configured to heat and stretch a polymer thin film in at least one in-plane direction in one or more distinct regions thereof. In some embodiments, a thin film orientation system may be configured to stretch a polymer thin film, i.e., a crystallizable polymer thin film, along only one in-plane direction. For instance, a thin film orientation system may be configured to apply an in-plane stress to a polymer thin film along the x-direction while allowing the thin film to relax along an orthogonal in-plane direction (e.g., along the y-direction). As used herein, the relaxation of a polymer thin film may, in certain examples, accompany the absence of an applied stress along a relaxation direction.

According to some embodiments, within an example orientation system, a polymer thin film may be heated and stretched transversely to a direction of film travel through the system. In such embodiments, a polymer thin film may be held along opposing edges by plural movable clips slidably disposed along a diverging track system such that the polymer thin film is stretched in a transverse direction (TD) as it moves along a machine direction (MD) through heating and deformation zones of the thin film orientation system. In some embodiments, the stretching rate in the transverse direction and the relaxation rate in the machine direction may be independently and locally controlled. In certain embodiments, large scale production may be enabled, for example, using a roll-to-roll manufacturing platform.

In certain aspects, the tensile stress may be applied uniformly or non-uniformly along a lengthwise or widthwise dimension of the polymer thin film. Heating of the polymer thin film may accompany the application of the tensile stress. For instance, a semi-crystalline polymer thin film may be heated to a temperature greater than room temperature (~23° C.) to facilitate deformation of the thin film and the formation and realignment of crystals and/or polymer chains therein.

The temperature of the polymer thin film may be maintained at a desired value or within a desired range before, during and/or after an act of stretching, i.e., within a pre-heating zone or a deformation zone downstream of the pre-heating zone, in order to improve the deformability of the polymer thin film relative to an un-heated polymer thin film. The temperature of the polymer thin film within a deformation zone may be less than, equal to, or greater than the temperature of the polymer thin film within a pre-heating zone.

In some embodiments, the polymer thin film may be heated to a constant temperature throughout an act of stretching. In some embodiments, a region of the polymer thin film may be heated to different temperatures, i.e., during and/or subsequent to the application of a tensile stress. In some embodiments, different regions of the polymer thin film may be heated to different temperatures. In certain embodiments, the strain realized in response to the applied tensile stress may be at least approximately 20%, e.g., approximately 20%, approximately 50%, approximately 100%, approximately 200%, approximately 400%, approximately 500%, approximately 1000%, approximately 2000%, approximately 3000%, or approximately 4000% or more, including ranges between any of the foregoing values.

The crystalline content within the polymer thin film may increase during an act of stretching. In some embodiments, stretching may alter the orientation of crystals within a polymer thin film without substantially changing the crystalline content.

In some embodiments, a protective layer may be formed over one or both major surfaces of a polymer thin film. The protective layer(s) may include an organic or an inorganic material, and may shield the polymer thin film against surface damage or debris, such as scratches or dust. The protective layer(s), if provided, may be removed prior to one or more acts of stretching, or the protective layer(s) may be removed following stretching. In various examples, the removable protective layer(s) may have a 90° peel strength of at least approximately 10 g/cm width (e.g., 10, 20, 50, 100, 200, 500, 1000 g/cm width or greater).

Following the act(s) of stretching, one or more thin film properties may be refined through hot pressing or hot calendaring. Uniaxial hot pressing, for example, may be performed in a rigid die with loading applied along a common axis. Some pressing systems may include a graphite die, which may be enclosed in a protective atmosphere or vacuum chamber. During hot pressing, temperature and pressure may be applied simultaneously to the stretched polymer thin film. Heating may be achieved using induction coils that surround the graphite die, and pressure may be applied hydraulically. Hot calendaring is a process of compressing a thin film during production by passing a polymer thin film between one or more pairs of heated rollers.

In some embodiments, a stretched polymer thin film may be pressed or calendared to at least approximately 50% of its initial thickness (e.g., 50%, 60%, 70%, or 80% of its initial thickness, including ranges between any of the foregoing values) under an applied pressure of at least approximately 2 MPa (e.g., 2, 3, 4, 5, or 10 MPa, including ranges between any of the foregoing values) and at a temperature of less than approximately 140° C. (e.g., 120° C., 125° C., 130° C., or 135° C., including ranges between any of the foregoing values).

A pressed or calendared polymer thin film may have a thickness of less than approximately 500 micrometers, e.g., less than 400 micrometers, less than 300 micrometers, or less than 200 micrometers. According to some embodiments, following hot pressing or hot calendaring, a polymer thin film may be stretched further using one or more additional stretching steps. In a post-hot pressing or post-hot calendaring stretching step, a polymer thin film may be stretched to a draw ratio of approximately 5 or greater (e.g., 5, 10, 20, 40, 60, 80, 100, 120, or 140, including ranges between any of the foregoing values).

Hot pressing or hot calendaring may increase transmissivity and/or thermal conductivity of a polymer thin film. According to some embodiments, the applied pressure may collapse voids within the polymer thin film, thus decreasing the overall void volume and increasing the density of the polymer matrix.

Following deformation of the polymer thin film, the heating may be maintained for a predetermined amount of time, followed by cooling of the polymer thin film. The act of cooling may include allowing the polymer thin film to cool naturally, at a set cooling rate, or by quenching, such as by purging with a low temperature gas, which may thermally stabilize the polymer thin film.

Following deformation, the crystals or chains may be at least partially aligned with the direction of the applied tensile stress. As such, a polymer thin film may exhibit a high degree of optical clarity and mechanical anisotropy, including one or any combination of: transmissivity within or across the visible spectrum (380-750 nm) of at least approximately 85% (e.g., 85, 90, 95, 97, or 99%, including ranges between any of the foregoing values), bulk haze of less than approximately 5% (e.g., 0, 0.5, 1, 2, 3, 4, or 5%, including ranges between any of the foregoing values), RF transparency of at least approximately 85% (e.g., 85, 90, 95, 97, or 99%, including ranges between any of the foregoing values), specific resistivity of at least approximately $10^{10}$ ohm/cm (e.g., $10^{10}$, $10^{12}$, or $10^{15}$ ohm/cm, including ranges between any of the foregoing values), a dielectric constant of less than approximately 3.5 (e.g., 3, 2.5, 2.2, or 2, including ranges between any of the foregoing values), a loss tangent of less than approximately 0.01 (e.g., 0.005, 0.001, 0.0005, including ranges between any of the foregoing values), an elastic modulus of at least approximately 20 GPa (e.g., 20, 30, 40, 50, 60, 70, 80, 90, or 100 GPa, including ranges between any of the foregoing values), tensile strength of at least approximately 0.5 GPa (e.g., 0.5, 1, or 1.5 GPa, including ranges between any of the foregoing values), thermal conductivity of at least approximately 5 W/mK (e.g., 5, 10, 20, 30, 40, 50, 60, 70, or 80 W/mK, including ranges between any of the foregoing values), void volume of less than approximately 5% (e.g., 0, 1, 2, 3, 4, or 5%, including ranges between any of the foregoing values) and an average void size of less than approximately 100 nm (e.g., 10, 20, 50, or 100 nm, including ranges between any of the foregoing values). In some embodiments, the modulus of a polymer thin film may be invariant or substantially invariant as a function of frequency (e.g., over a range of 0.1 to 100 Hz, for example). These and other properties may exhibit an in-plane anisotropy ranging from approximately 2:1 to approximately 100:1 or more, e.g., 2:1, 3:1, 4:1, 5:1, 10:1, 20:1, 50:1, or 100:1.

Polyethylene thin films may include fibrous, amorphous, partially crystalline, or wholly crystalline materials. Such materials may also exhibit anisotropy with respect to one or more further characteristics, which may include compressive strength, shear strength, yield strength, stiffness, hardness, toughness, ductility, machinability, thermal expansion, and creep behavior.

In accordance with various embodiments, an anisotropic polyethylene thin film may be formed by applying a desired stress state to a crystallizable polymer thin film. A polymer composition capable of crystallizing may be formed into a single layer using appropriate extrusion and casting operations well known to those skilled in the art. For example, an ethylene-containing composition may be extruded and oriented as a single layer to form a mechanically and thermal conductively anisotropic thin film. According to further embodiments, a crystallizable polymer may be co-extruded with other polymer materials that are either crystallizable, or those that remain amorphous after orientation to form a multilayer structure.

Following deformation, the crystals or chains may be at least partially aligned with the direction of the applied tensile stress. As such, a polyethylene thin film may exhibit a high degree of optical clarity and in-plane anisotropy, including an in-plane thermal conductivity of at least approximately 5 W/mK, and an elastic modulus of at least approximately 20 GPa.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-9, detailed descriptions of polymer layers and bilayers and their methods of manufacture. The discussion associated with FIG. 1 relates to the structure and properties of example polymer bilayers having a high modulus and a high thermal conductivity. The discussion associated with FIGS. 2 and 3 includes a description of example manufacturing methods for forming such polymer bilayers. The discussion associated with FIGS. 4-7 includes a description of the optical performance and thermoregulatory behavior of example polymer layers, including exemplary polymer bilayers. The discussion associated with FIGS. 8 and 9 relates to exemplary virtual reality and augmented reality devices that may include one or more polymer bilayer thin films or fibers as disclosed herein.

Referring to FIG. 1, illustrated is an example polymer bilayer 100 that includes a layer of ultra-high molecular weight polyethylene (UHMWPE) 102 directly overlying a layer of polyvinylidene fluoride (PVDF) 104. In various bilayer architectures, the polyvinylidene fluoride may be porous whereas the polyethylene layer may be porous or dense. The respective polymer layers may be formed co-continuously or separately and subsequently bonded. A variety of methods may be used to form the polymer bilayer.

A one-dimensional polymer bilayer architecture may be formed using a fiber melt spinning line where two polymer compositions may be co-extruded into a core-shell fiber geometry. Polymers may be extruded in solution or melt states. An example fiber melt spinning apparatus is shown schematically in FIG. 2. Apparatus 200 includes polymer inlet hoppers 205, 225, which are configured to feed the polymer materials (e.g., polyethylene and polyvinylidene fluoride) to respective screws 210, 220. Screws 210, 220 may be configured to co-rotate or counter-rotate, for example.

Spinning head die 215, 240 combines the polymer materials into a fiber 230 having a core-shell structure. Fiber 230 may be drawn in air or in a solvent bath to control the fiber cooling rate and introduce porosity into the fluoropolymer and optionally into the polyethylene. Fiber 230 may be collected on a rotating spool 235. In some embodiments, the velocity of the spool 235 may be used to control the draw ratio of the nascent fiber.

The fluoropolymer may include a foaming agent to introduce pores into the fiber core. The size and distribution of the pores may be controlled by the composition and amount of the foaming agent as well as the processing temperature and draw rate.

In some embodiments, the polyethylene layer may form the cladding of a bilayer fiber. In the example of a porous polyethylene layer, which may be formed using a solvent exchange technique, the pore size in the cladding may be less than the pore size in the core. Thus, example fibers may be characterized by a bimodal void size distribution.

Figure 3:
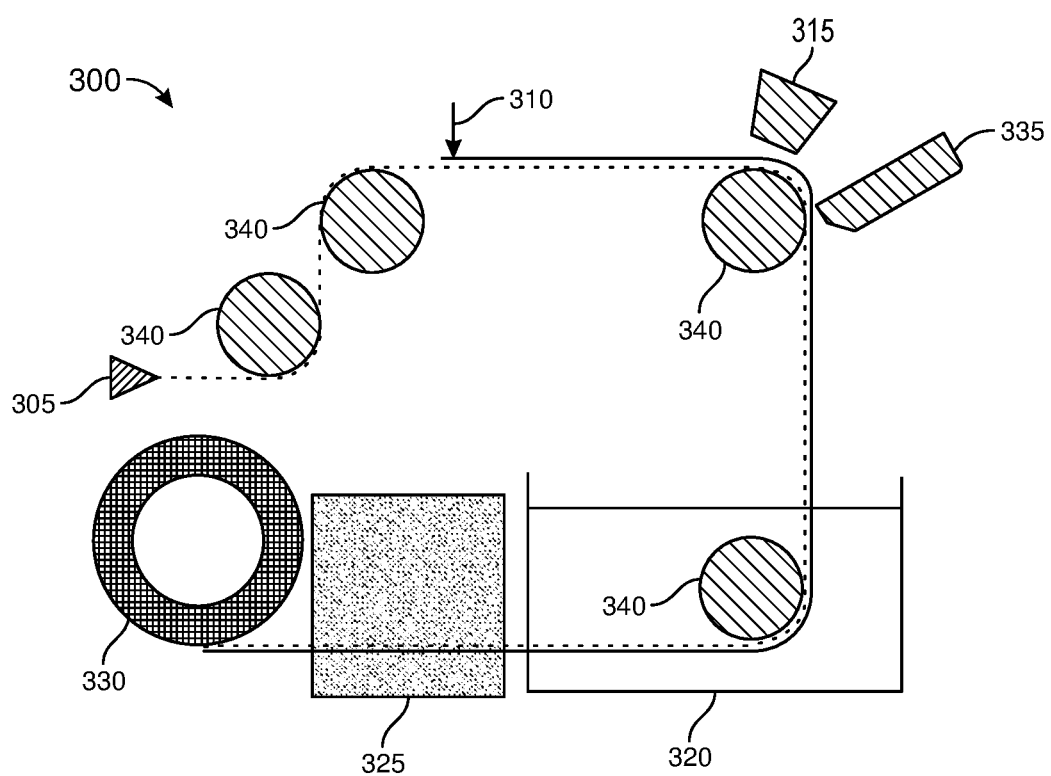
FIG. 3 illustrates an example apparatus for forming a two-dimensional polymer article according to further embodiments.

Referring to FIG. 3, illustrated schematically is an alternate apparatus for forming a polymer bilayer. In conjunction with apparatus 300, a fluoropolymer thin film 305 having a high or ultra-high molecular weight and low entanglement density may be cast from solution, passed over a pair of rollers 340, and coated (e.g., on one major surface) with a polyethylene thin film 310. The polyethylene thin film 310 may be formed from solution or a melted phase. Suitable solvents for casting a polyethylene thin film 310 from solution may include a low molecular weight polyethylene wax, decalin, a decalin-dodecanol mixture, paraffin oil, mineral oil, lauric acid, stearic acid, mixtures thereof, and the like.

An air knife 315 and/or blade 335 may be used to control the thickness of the polyethylene thin film 310. A suitable shear stress (i.e., shear rate) and desired strain, and an attendant alignment of polyethylene chains, may be introduced to the polyethylene thin film 310 by controlling one or more of the relative rotation speed of rollers 340, the air pressure in the air knife 315, and a distance between blade 335 and the polymer bilayer.

The polymer bilayer may be passed successively through a solvent bath 320 and a drying oven 325 prior to being wound onto a storage roller 330. In some embodiments, a difference in the rotation speed between the rollers 340 and the storage roller 330 may be used to stretch the polymer bilayer to a suitable draw ratio.

The optical performance and thermoregulatory behavior of example polymer bilayers and comparative structures is discussed below. The Fourier-transform infrared spectroscopy (FTIR) reflectance data shown in FIGS. 4-7 provides insight into the passive cooling attributes of highly thermally conductive polyethylene and bilayers that include polyethylene laminated to a highly emissive layer of porous PVDF.

Figure 4:
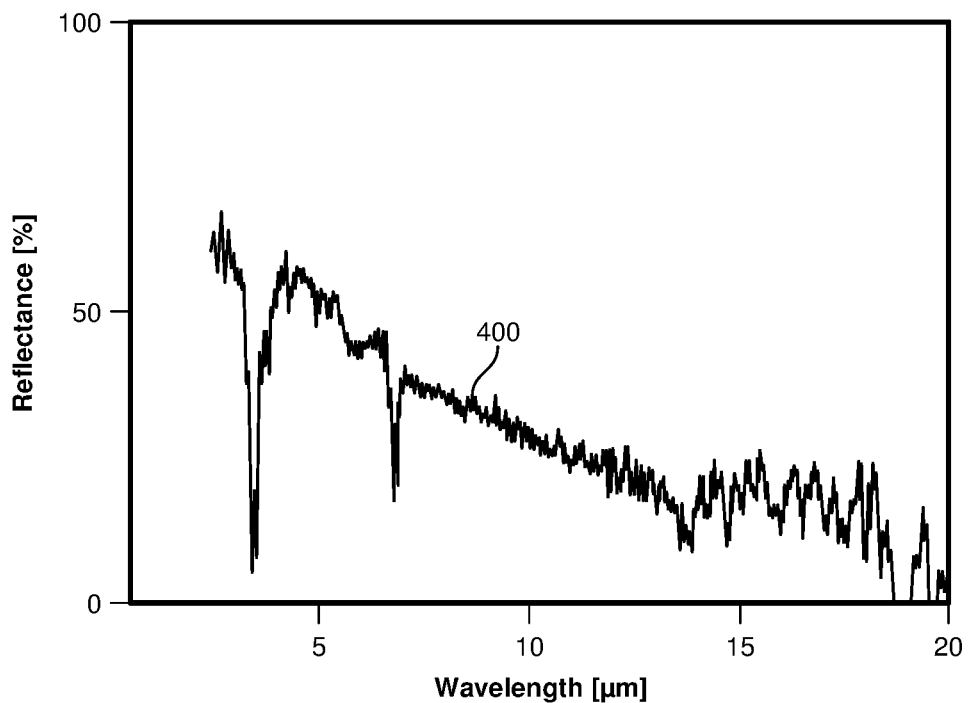
FIG. 4 is a plot of reflectance versus wavelength across the infrared spectrum for a non-optical quality polyethylene thin film according to some embodiments.

Referring to FIG. 4, shown is the reflectance curve 400 for a single layer of non-optical grade polyethylene. Within the LWIR spectrum ($\lambda\sim$8-14 micrometers), the polyethylene thin film exhibits a reflectance of greater than approximately 10%, i.e., from approximately 10% to approximately 35%. That is, assuming a transmissivity of zero, the LWIR emissivity of the non-optical grade polyethylene thin film ranges from approximately 65% to approximately 90%, which may be insufficient for effective transfer of the thermal energy accumulated within or upstream of the bilayer.

Figure 5:
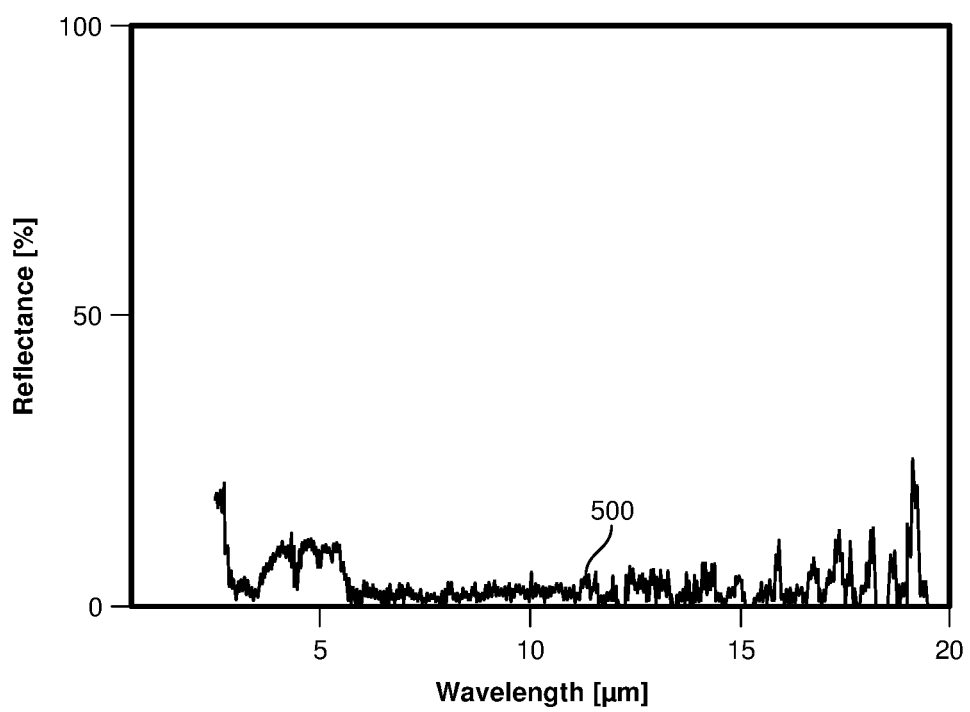
FIG. 5 is a plot of reflectance versus wavelength across the infrared spectrum for a polymer article including a non-optical quality polyethylene thin film and a layer of an IR reflective paint according to some embodiments.

Turning to FIG. 5, shown is the reflectance curve 500 for a composite structure that includes a layer of non-optical grade polyethylene and an adjacent IR reflective coating. Within the long wavelength infrared spectrum, the addition of the IR reflective coating may advantageously decrease the reflectance of the composite structure relative to the PE thin film alone. As shown in FIG. 5, the reflectance across the long wavelength infrared spectrum ($\lambda\sim$8-14 micrometers) is less than approximately 10%, e.g., less than approximately 5%. However, the incorporation of the IR reflective coating may also decrease the reflectance within shorter wavelengths of the infrared spectrum (0.25<$\lambda$<5 micrometers), which may promote absorption (rather than reflection) of the solar heating spectrum. In reflectance curve 500, the reflectance within shorter wavelengths of the infrared spectrum (0.25<$\lambda$<5 micrometers), may be approximately 5% or greater, e.g., approximately 10%.

Applicants have shown that a polymer bilayer that includes a polyethylene layer and a porous fluoropolymer layer directly overlying the polyethylene layer may be characterized by a reflectance within or across shorter wavelengths of the infrared spectrum (0.25<$\lambda$<5 micrometers) of at least approximately 10%, e.g., at least 10%, at least 15%, or at least 20%, including ranges between any of the foregoing values, and a reflectance within or across the long wavelength infrared spectrum ($\lambda\sim$8-14 micrometers) of less than approximately 10%. The porous fluoropolymer layer may include a porous PVDF foam. In some embodiments, the PVDF foam may be supported by a non-porous layer of PVDF, although other polymer support layers are contemplated.

Figure 6:
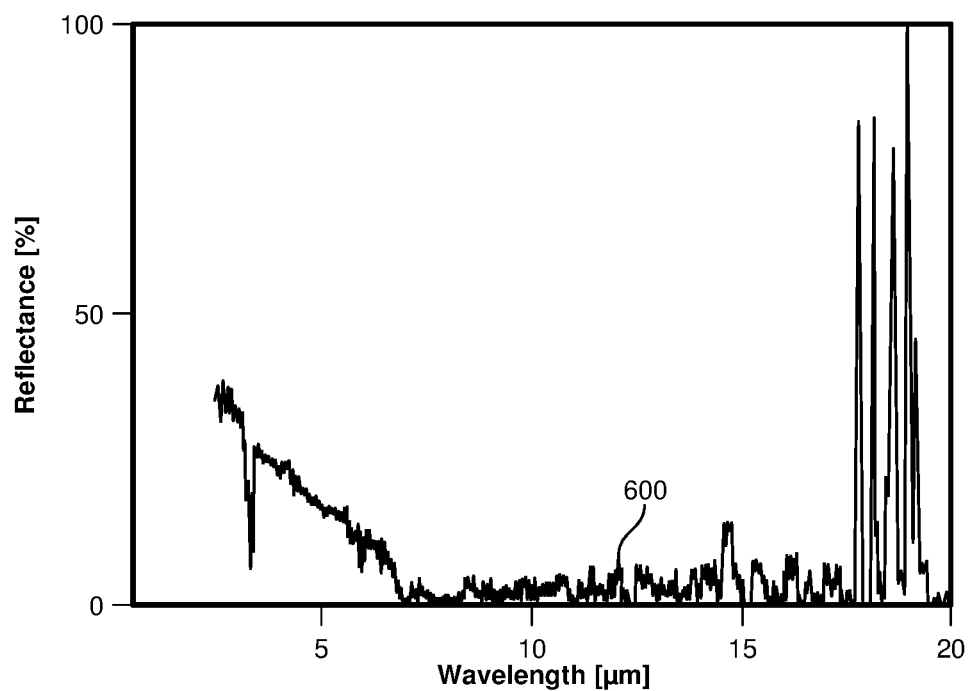
FIG. 6 is a plot of reflectance versus wavelength across the infrared spectrum for a polymer bilayer including a non-optical quality polyethylene thin film and a supported layer of an IR reflective PVDF foam.

By way of example, and with reference to FIG. 6, shown is the reflectance curve 600 for a composite structure that includes a layer of non-optical grade polyethylene and a PVDF-supported layer of porous PVDF foam. As shown in FIG. 6, the reflectance across shorter wavelengths of the infrared spectrum (0.25<$\lambda$<5 micrometers) is greater than approximately 10%, e.g., greater than approximately 15%, and the reflectance across the long wavelength infrared spectrum ($\lambda\sim$8-14 micrometers) is less than approximately 10%, e.g., less than approximately 5%.

Figure 7:
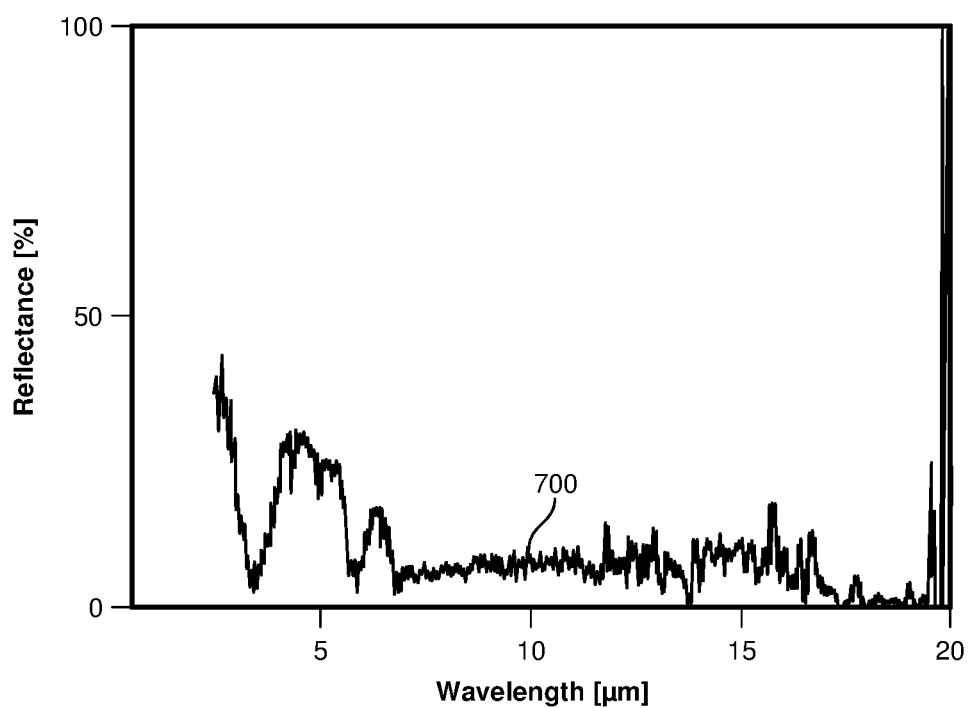
FIG. 7 is a plot of reflectance versus wavelength across the infrared spectrum for a polymer bilayer including an optical quality polyethylene thin film and a supported layer of an IR reflective PVDF foam.

Turning to FIG. 7, shown is the reflectance curve 700 for a composite structure that includes a layer of optical grade (optically transparent) polyethylene, a layer of pigment, and a PVDF-supported layer of porous PVDF foam. With the incorporation of an optical grade layer of polyethylene, the pigment layer may be included, e.g., between the polyethylene and PVDF foam layers, which may be desirable for certain applications. As shown in FIG. 7, the reflectance for such a stack (PE/pigment/PVDF foam/PVDF support) across shorter wavelengths of the infrared spectrum (0.25<$\lambda$<5 micrometers) may be greater than approximately 10%, e.g., greater than approximately 15% or greater than approximately 20%, whereas the reflectance across the long wavelength infrared spectrum ($\lambda\sim$8-14 micrometers) may be less than approximately 10%. This combination of thermoregulatory behavior may be effective in passively cooling a system or device affixed to the PE/pigment/PVDF foam/PVDF support architecture.

As disclosed herein, a polymer structure includes an optically transparent layer of ultra-high molecular weight polyethylene (UHMWPE) that may be configured to provide a platform to achieve passive cooling in a co-integrated element or device, e.g., during exposure to sunlight, by leveraging the transparency and high thermal conductivity of the UHMWPE layer across the LWIR spectrum (8-14 μm). In some embodiments, the UHMWPE may have a molecular weight of at least approximately 300,000 g/mol. The high thermal conductivity of the UHMWPE layer may substantially attenuate thermal throttling by promoting thermal dispersion over a larger surface area, which may increase thermal dissipation through convective heat transport.

In addition to the optical quality UHMWPE, the polymer structure may include an IR reflective layer, such as a layer of a tinted IR reflective paint. In a related vein, the UHMWPE layer itself may be optically transparent or pigmented. In some embodiments, the polymer structure may additionally include a layer of porous PVDF. The porous PVDF layer, if provided, may be characterized by high reflectivity in the UV, visible, and near IR spectrums, as well as high emissivity in the LWIR.

The UHMWPE layer and the optional PVDF layer may be formed simultaneously, e.g., via co-extrusion, or separately and then laminated to form a multilayer polymer structure. Further thin film forming techniques include melt extrusion, casting, calendaring, compression molding, etc. A drawing operation may be applied to the layers individually or to the assembled polymer structure to induce strain and produce desired optical properties, including a desired thermoregulatory response.

EXAMPLE EMBODIMENTS

Example 1

A layered structure has an optically transparent layer including ultra-high molecular weight polyethylene and an IR reflective layer overlying the optically transparent layer, where the layered structure has a short wavelength ($0.25<\lambda<5$ μm) infrared reflectance of at least approximately 10%, and a long wavelength ($8<\lambda<14$ μm) infrared reflectance of less than approximately 10%.

Example 2

The layered structure of Example 1, where the optically transparent layer has a thermal conductivity of at least approximately 5 W/mK.

Example 3

The layered structure of any of Examples 1 and 2, where the optically transparent layer has an elastic modulus of at least approximately 2 GPa and a tensile strength of at least approximately 0.7 GPa.

Example 4

The layered structure of any of Examples 1-3, where the IR reflective layer includes an IR reflective paint.

Example 5

The layered structure of Example 4, where the IR reflective paint includes nanoscale particles of a pigment selected from organic dyes and metal oxides.

Example 6

The layered structure of any of Examples 1-5, where the IR reflective layer includes a porous fluoropolymer.

Example 7

The layered structure of Example 6, where the porous fluoropolymer includes polyvinylidene fluoride (PVDF).

Example 8

The layered structure of any of Examples 6 and 7, where the porous fluoropolymer is selected from PVDF-CTFE, PVDF-HFP, PVDF-TFE, PVDF-TrFE, PVDF-TrFE-TFE, and combinations thereof.

Example 9

The layered structure of any of Examples 6-8, where the porous fluoropolymer has a porosity of at least approximately 15 vol. %.

Example 10

The layered structure of any of Examples 6-9, where the porous fluoropolymer includes pores having an average pore size of at least approximately 100 nm.

Example 11

The layered structure of any of Examples 1-10, where a thickness of the optically transparent layer is less than a thickness of the IR reflective layer.

Example 12

The layered structure of any of Examples 1-11, where a thickness of the optically transparent layer ranges from approximately 10 micrometers to approximately 1 mm and a thickness of the IR reflective layer ranges from approximately 0.2 mm to approximately 1 mm.

Example 13

A device including the layered structure of any of Examples 1-12, where the device is selected from smart watches, and virtual reality (VR), augmented reality (AR), and mixed reality (MR) glasses and headsets.

Example 14

A layered structure includes an optically transparent layer of ultra-high molecular weight polyethylene, and an IR reflective layer directly overlying the optically transparent layer, where the optically transparent layer has a thermal conductivity of at least approximately 5 W/mK and an elastic modulus of at least approximately 2 GPa.

Example 15

The layered structure of Example 14, where the layered structure has a short wavelength ($0.25<\lambda<5$ μm) infrared reflectance of at least approximately 10%, and a long wavelength ($8<\lambda<14$ μm) infrared reflectance of less than approximately 10%.

Example 16

The layered structure of any of Examples 14 and 15, where the IR reflective layer includes an IR reflective paint.

Example 17

A method includes forming an optically transparent layer of ultra-high molecular weight polyethylene, and forming an IR reflective layer over the optically transparent layer to create a layered structure having a short wavelength ($0.25<\lambda<5$ μm) infrared reflectance of at least approximately 10% and a long wavelength ($8<\lambda<14$ μm) infrared reflectance of less than approximately 10%.

Example 18

The method of Example 17, where forming the IR reflective layer over the optically transparent layer includes laminating the IR reflective layer to the optically transparent layer.

Example 19

The method of any of Examples 17 and 18, further including forming a layer of a pressure sensitive adhesive or a layer of an optically clear adhesive between the optically transparent layer and the IR reflective layer.

Example 20

The method of any of Examples 17-19, where forming the optically transparent layer includes vacuum compression molding a fibrous polyethylene mat.

Example 21

The method of Example 20, where the fibrous polyethylene mat includes a plurality of knit or woven ultra-high molecular weight polyethylene fibers.

Example 22

The method of any of Examples 20 and 21, where the fibrous polyethylene mat includes a plurality of non-woven ultra-high molecular weight polyethylene fibers.

Example 23

The method of any of Examples 20-22, further including deforming the layered structure to a compound curvature.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 800 in FIG. 8) or that visually immerses a user in an artificial reality (e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
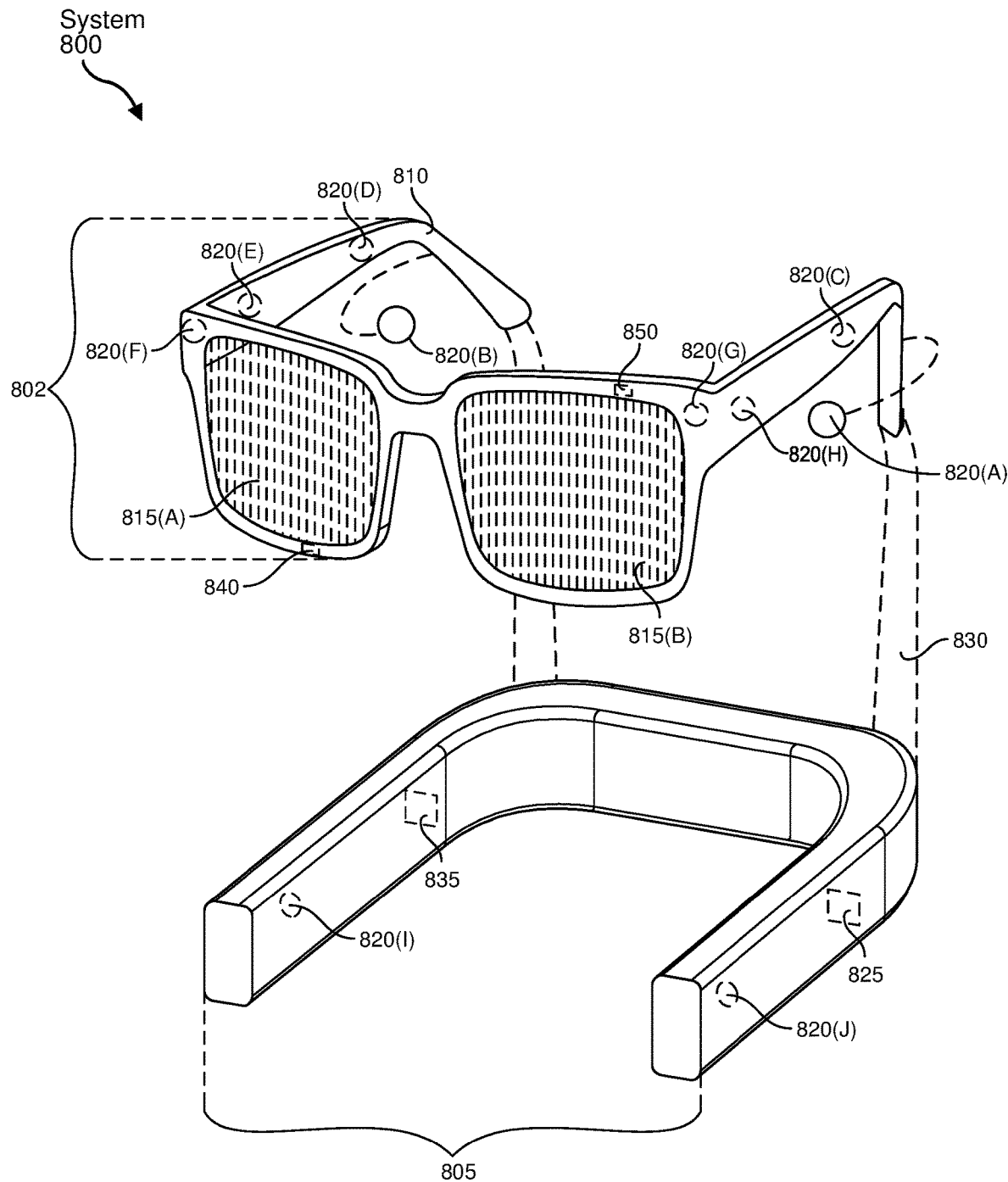
FIG. 8 is an illustration of exemplary augmented-reality glasses that may be used in connection with embodiments of this disclosure.
Figure 9:
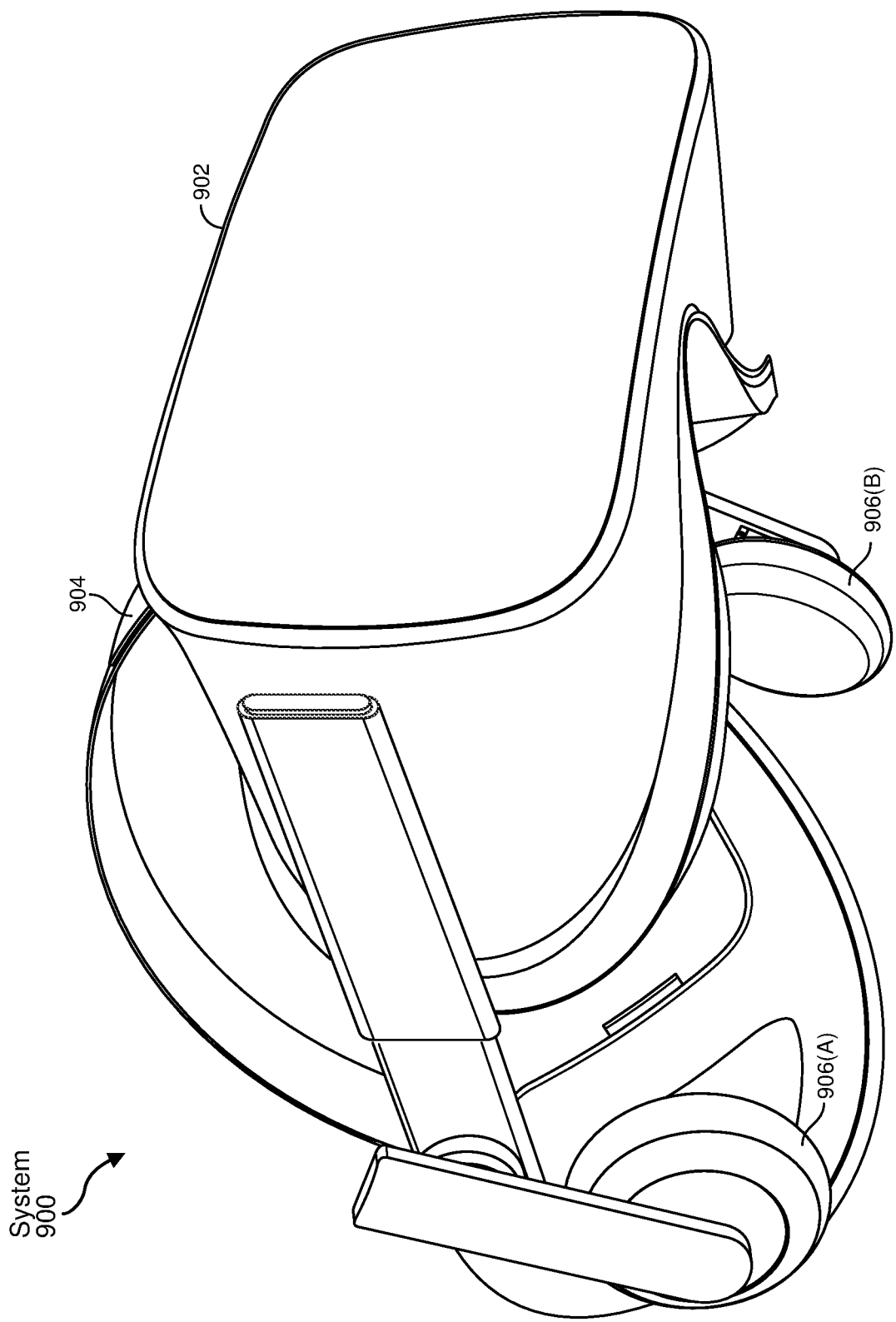
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

Augmented-reality system 800 may also include a microphone array with a plurality of acoustic transducers 820(A)-820(J), referred to collectively as acoustic transducers 820. Acoustic transducers 820 may be transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(F) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a Bluetooth connection). In still other embodiments, acoustic transducers 820(A) and 820(B) may not be used at all in conjunction with augmented-reality system 800.

Acoustic transducers 820 on frame 810 may be positioned along the length of the temples, across the bridge, above or below display devices 815(A) and 815(B), or some combination thereof. Acoustic transducers 820 may be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 9, output audio transducers 906(A) and 906(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 8, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a fluoropolymer that comprises or includes PVDF include embodiments where a fluoropolymer consists essentially of PVDF and embodiments where a fluoropolymer consists of PVDF.

What is claimed is:

1. A layered structure comprising:
   an optically transparent layer comprising ultra-high molecular weight polyethylene; and
   an IR reflective layer overlying the optically transparent layer, wherein a thickness of the optically transparent layer ranges from approximately 10 micrometers to approximately 1 mm and a thickness of the IR reflective layer ranges from approximately 0.2 mm to approximately 1 mm, the IR reflective layer comprises an IR reflective PVDF foam, and the layered structure has a short wavelength ($0.25<\lambda<5$ µm) infrared reflectance of at least approximately 10%, and a long wavelength ($8<\lambda<14$ µm) infrared reflectance of less than approximately 10%.

2. The layered structure of claim 1, wherein the optically transparent layer has a thermal conductivity of at least approximately 5 W/mK.

3. The layered structure of claim 1, wherein the optically transparent layer has an elastic modulus of at least approximately 2 GPa and a tensile strength of at least approximately 0.7 GPa.

4. The layered structure of claim 1, wherein the IR reflective layer comprises an IR reflective paint overlying the optically transparent layer.

5. The layered structure of claim 4, wherein the IR reflective paint comprises an organic dye or nanoscale particles of a metal oxide.

6. The layered structure of claim 1, wherein the PVDF foam comprises a PVDF-based polymer selected from the group consisting of PVDF-CTFE, PVDF-HFP, PVDF-TFE, PVDF-TrFE, PVDF-TrFE-TFE, and combinations thereof.

7. The layered structure of claim 1, wherein the PVDF foam has a porosity of at least approximately 15 vol. %.

8. The layered structure of claim 1 wherein the PVDF foam comprises pores having an average pore size of at least approximately 100 nm.

9. The layered structure of claim 1, wherein a thickness of the optically transparent layer is less than a thickness of the IR reflective layer.

10. A device comprising the layered structure of claim 1, wherein the device is selected from the group consisting of smart watches, and virtual reality (VR), augmented reality (AR), and mixed reality (MR) glasses and headsets.

11. A layered structure comprising:
    an optically transparent layer of ultra-high molecular weight polyethylene; and
    an IR reflective layer directly overlying the optically transparent layer, wherein a thickness of the optically transparent layer ranges from approximately 10 micrometers to approximately 1 mm and a thickness of the IR reflective layer ranges from approximately 0.2 mm to approximately 1 mm, the optically transparent layer has a thermal conductivity of at least approximately 5 W/mK and an elastic modulus of at least approximately 2 GPa, and the IR reflective layer comprises an IR reflective PVDF foam.

12. The layered structure of claim 11, wherein the layered structure has a short wavelength ($0.25<\lambda<5$ µm) infrared reflectance of at least approximately 10%, and a long wavelength ($8<\lambda<14$ µm) infrared reflectance of less than approximately 10%.

13. The layered structure of claim 11, wherein the IR reflective layer comprises an IR reflective paint.

14. A method comprising:
    forming an optically transparent layer of ultra-high molecular weight polyethylene; and
    forming an IR reflective layer over the optically transparent layer to create a layered structure having a short wavelength ($0.25<\lambda<5$ µm) infrared reflectance of at least approximately 10% and a long wavelength ($8<\lambda<14$ µm) infrared reflectance of less than approximately 10% a thickness of the optically transparent layer ranges from approximately 10 micrometers to approximately 1 mm and a thickness of the IR reflective layer ranges from approximately 0.2 mm to approximately 1 mm, and, wherein forming the IR reflective layer comprises forming a PVDF foam layer by inversion phase separation of a polymer solution in a non-solvent bath.

15. The method of claim 14, wherein forming the IR reflective layer over the optically transparent layer comprises laminating the IR reflective layer to the optically transparent layer.

16. The method of claim 14, further comprising forming a layer of a pressure sensitive adhesive or a layer of an optically clear adhesive between the optically transparent layer and the IR reflective layer.

17. The method of claim 14, wherein forming the optically transparent layer comprises vacuum compression molding a fibrous polyethylene mat.

* * * * *